US011838907B2

(12) United States Patent
 Takeda et al.

(10) Patent No.: US 11,838,907 B2
(45) Date of Patent: Dec. 5, 2023

(54) SIMULTANEOUS FEEDBACK INFORMATION AND UPLINK SHARED CHANNEL TRANSMISSIONS

(71) Applicant: QUALCOMM Incorporated, San Diego, CA (US)

(72) Inventors: Kazuki Takeda, Tokyo (JP); Peter Gaal, San Diego, CA (US); Wanshi Chen, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 17/164,567

(22) Filed: Feb. 1, 2021

(65) Prior Publication Data

US 2021/0243778 A1    Aug. 5, 2021

Related U.S. Application Data

(60) Provisional application No. 62/970,165, filed on Feb. 4, 2020.

(51) Int. Cl.
 *H04L 5/00* (2006.01)
 *H04W 72/1268* (2023.01)
 (Continued)

(52) U.S. Cl.
 CPC ...... *H04W 72/1268* (2013.01); *H04B 7/0626* (2013.01); *H04L 1/1664* (2013.01);
 (Continued)

(58) Field of Classification Search
 None
 See application file for complete search history.

(56) References Cited

U.S. PATENT DOCUMENTS 9,210,698 B2 * 12/2015 Yang ............... H04L 1/1671
10,314,037 B2 * 6/2019 Chen ............... H04W 72/21
(Continued)

FOREIGN PATENT DOCUMENTS

KR    20190028262 A    3/2019
WO    WO-2019159303 A1 *    8/2019

OTHER PUBLICATIONS

International Search Report and Written Opinion—PCT/US2021/016195—ISA/EPO—dated Apr. 21, 2021.
(Continued)

*Primary Examiner* — Sithu Ko
(74) *Attorney, Agent, or Firm* — Holland & Hart LLP

(57) ABSTRACT

Methods, systems, and devices for wireless communications are described. A UE may receive a piggybacking status for a first uplink carrier of a set of uplink carriers configured for the UE, receive a first uplink grant that indicates an uplink shared channel occasion on the first uplink carrier, generate uplink control information for a downlink transmission from a base station, where the uplink control information may be associated with an uplink control channel occasion that overlaps in time with the uplink shared channel occasion, and perform, based on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion.

82 Claims, 20 Drawing Sheets

(51) Int. Cl.
  *H04B 7/06* (2006.01)
  *H04L 1/1607* (2023.01)
  *H04W 72/0453* (2023.01)
  *H04W 72/21* (2023.01)
  *H04W 72/23* (2023.01)
  *H04W 72/50* (2023.01)

(52) U.S. Cl.
  CPC ....... *H04W 72/0453* (2013.01); *H04W 72/21* (2023.01); *H04W 72/23* (2023.01); *H04W 72/535* (2023.01)

(56) References Cited

U.S. PATENT DOCUMENTS

| | | | |
|---|---|---|---|
| 10,966,223 B2* | 3/2021 | Kundu | H04W 72/0446 |
| 10,986,591 B2* | 4/2021 | MolavianJazi | H04W 52/367 |
| 11,115,150 B2* | 9/2021 | Cheng | H04L 5/0053 |
| 11,564,212 B2* | 1/2023 | Wang | H04W 72/23 |
| 11,627,599 B2* | 4/2023 | Han | H04L 1/1664 370/329 |
| 2013/0100917 A1* | 4/2013 | Seo | H04W 72/1284 370/329 |
| 2018/0006790 A1* | 1/2018 | Park | H04L 1/1887 |
| 2018/0070352 A1* | 3/2018 | Takeda | H04W 72/21 |
| 2021/0092762 A1* | 3/2021 | Choi | H04L 1/1887 |

OTHER PUBLICATIONS

Lenovo, et al., "Multiplexing Between PUCCH and PUSCH", 3GPP Draft; 3GPP TSG RAN WG1 Meeting #92bis, R1-1804213, Multiplexing between PUCCH and PUSCH_FINAL, 3rd Generation Partnership Project (3GPP), Mobile Competence Centre; 650, Route Des Lucioles; F-06921 Sophia-Antipolis Cedex; Fran, vol. RAN WG1, No. Sanya, China; Apr. 16, 2018-Apr. 20, 2018, pp. 1-4, Apr. 15, 2018 (Apr. 15, 2018), XP051426501, Retrieved from the Internet: URL: http://www.3gpp.org/ftpfMeetings%5F3GPP% 5FSYNC/RAN1/Docs/ [retrieved on Apr. 15, 2018] proposal 8.
LG Electronics: "Enhancements on Multi-TRP/Panel Transmission", 3GPP Draft, 3GPP TSG RAN WG1 Meeting #97, R1-1906730_ MTRP, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019- May 17, 2019 May 13, 2019 (May 13, 2019), XP051728181, pp. 1-11, Section 2.3.
LG Electronics: "UCI Piggyback onto Pusch for Carrier Aggregation", R1-102692, 3GPP TSG RAN WG1 #61, 3rd Generation Partnership Project (3GPP), Mobile Competence Centre, 650, Route Des Lucioles, F-06921 Sophia-Antipolis Cedex, France, XP050419899, Montreal, Canada, May 10-14, 2010, 4 Pages.

\* cited by examiner

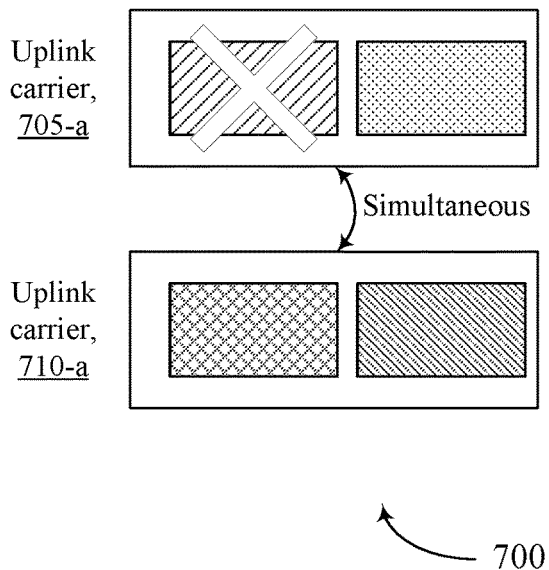
FIG. 7A
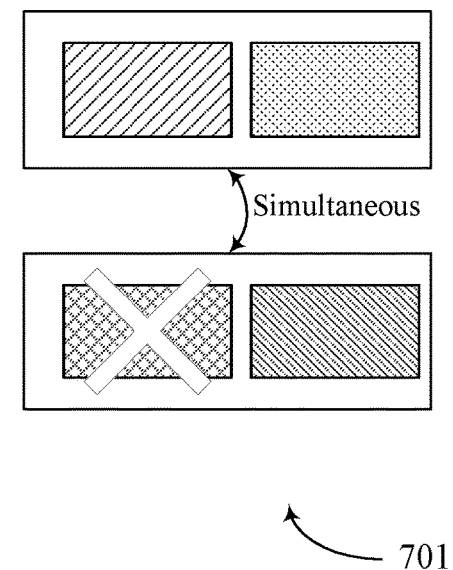
FIG. 7B
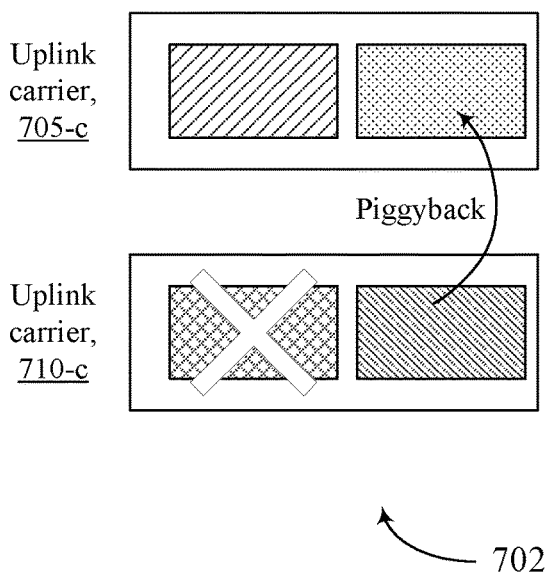
FIG. 7C
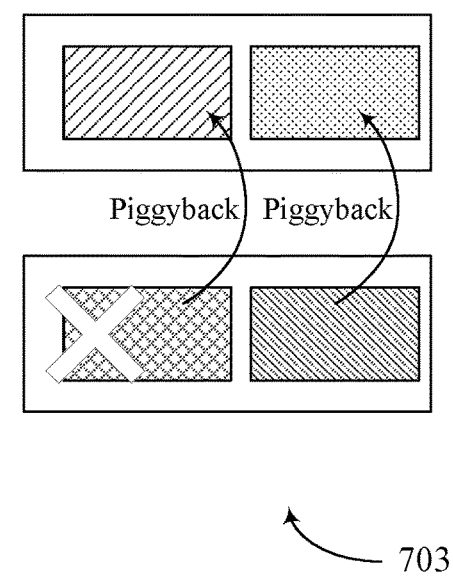
FIG. 7D
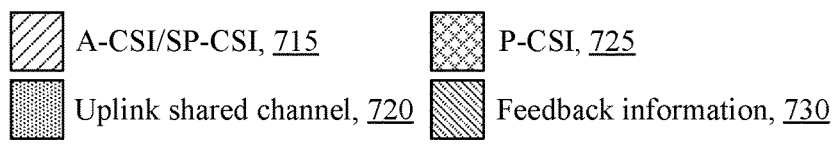

SIMULTANEOUS FEEDBACK INFORMATION AND UPLINK SHARED CHANNEL TRANSMISSIONS

CROSS REFERENCE

The present application for patent claims the benefit of U.S. Provisional patent Application No. 62/970,165 by TAKEDA et al., entitled "SIMULTANEOUS FEEDBACK INFORMATION AND UPLINK SHARED CHANNEL TRANSMISSIONS," filed Feb. 4, 2020, assigned to the assignee hereof, and expressly incorporated by reference herein.

FIELD OF TECHNOLOGY

The following relates generally to wireless communications and more specifically to simultaneous feedback information and uplink shared channel transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support simultaneous feedback information (e.g., uplink control information) and uplink shared channel transmissions. Generally, the described techniques provide for simultaneous physical uplink control channel (PUCCH) and physical uplink shared channel (PUSCH) transmissions. For example, wireless communications systems may support and enable simultaneous PUCCH-PUSCH across two or more carriers. In some cases, to efficiently support simultaneous PUCCH-PUSCH, a carrier configured for a PUSCH transmission may further be configured to disable control information (e.g., a carrier configured for PUSCH in a simultaneous PUCCH-PUSCH scenario may be configured as a data only carrier). For example, wireless communications systems may configure (e.g., via radio resource control (RRC) signaling) simultaneous PUCCH-PUSCH across two or more carriers, where piggybacking of feedback information on an uplink shared channel transmission may be disabled. In other words, wireless communications systems may configure simultaneous PUCCH-PUSCH such that feedback information (e.g., hybrid automatic repeat request (HARQ) feedback, periodic channel state information (P-CSI)) of PUCCH may not be piggybacked (e.g., multiplexed) on the PUSCH.

A method of wireless communication at a user equipment (UE) is described. The method may include receiving a piggybacking status for a first uplink carrier of a set of uplink carriers configured for the UE, receiving a first uplink grant that indicates an uplink shared channel occasion on the first uplink carrier, generating uplink control information for a downlink transmission from a base station, where the uplink control information is associated with an uplink control channel occasion that overlaps in time with the uplink shared channel occasion, and performing, based on the piggybacking status for the first uplink carrier, an uplink shared channel transmission on the first uplink carrier during the uplink shared channel occasion and a uplink control transmission of the uplink control information on a second uplink carrier of the set of uplink carriers during the uplink control channel occasion.

An apparatus for wireless communication at a UE is described. The apparatus may include a processor, memory coupled with the processor, and instructions stored in the memory. The instructions may be executable by the processor to cause the apparatus to receive a piggybacking status for a first uplink carrier of a set of uplink carriers configured for the UE, receive a first uplink grant that indicates an uplink shared channel occasion on the first uplink carrier, generate uplink control information for a downlink transmission from a base station, where the uplink control information is associated with an uplink control channel occasion that overlaps in time with the uplink shared channel occasion, and perform, based on the piggybacking status for the first uplink carrier, an uplink shared channel transmission on the first uplink carrier during the uplink shared channel occasion and a uplink control transmission of the uplink control information on a second uplink carrier of the set of uplink carriers during the uplink control channel occasion.

Another apparatus for wireless communication at a UE is described. The apparatus may include means for receiving a piggybacking status for a first uplink carrier of a set of uplink carriers configured for the UE, receiving a first uplink grant that indicates an uplink shared channel occasion on the first uplink carrier, generating uplink control information for a downlink transmission from a base station, where the uplink control information is associated with an uplink control channel occasion that overlaps in time with the uplink shared channel occasion, and performing, based on the piggybacking status for the first uplink carrier, an uplink shared channel transmission on the first uplink carrier during the uplink shared channel occasion and a uplink control transmission of the uplink control information on a second uplink carrier of the set of uplink carriers during the uplink control channel occasion.

A non-transitory computer-readable medium storing code for wireless communication at a UE is described. The code may include instructions executable by a processor to receive a piggybacking status for a first uplink carrier of a set of uplink carriers configured for the UE, receive a first uplink grant that indicates an uplink shared channel occasion on the first uplink carrier, generate uplink control information for a downlink transmission from a base station, where the uplink control information is associated with an uplink control channel occasion that overlaps in time with the uplink shared channel occasion, and perform, based on the piggybacking status for the first uplink carrier, an uplink shared channel transmission on the first uplink carrier during the uplink shared channel occasion and a uplink control transmission of the uplink control information on a second uplink carrier of the set of uplink carriers during the uplink control channel occasion.

Some examples of the method, apparatuses, and non-transitory computer-readable medium described herein may further include operations, features, means, or instructions for selecting the second uplink carrier for the uplink control transmission based on the piggybacking status for the first uplink carrier and the uplink control channel occasion overlapping in time with the uplink shared channel occasion.

In some examples of the method, apparatuses, and non-transitory computer-readable medium described herein, receiving the piggybacking status for the first uplink carrier may include operations, features, means, or instructions for receiving a control message including an indication that uplink control information piggybacking may be disabled for the first uplink carrier.

In some examples of the method, apparatuses, and non-transitory computer-readable medium described herein, receiving the piggybacking status for the first uplink carrier may include operations, features, means, or instructions for receiving a control message including an indication that uplink control information piggybacking may be disabled for a group of uplink carriers within the set of uplink carriers, where the group of uplink carriers includes the first uplink carrier.

In some examples of the method, apparatuses, and non-transitory computer-readable medium described herein, the group of uplink carrier may be grouped according to one or more of: the frequency range, frequency band, timing advance (TA) group, cell group, PUCCH group, or UE.

In some examples of the method, apparatuses, and non-transitory computer-readable medium described herein, receiving the piggybacking status for the first uplink carrier may include operations, features, means, or instructions for receiving a control message including an indication that uplink control information piggybacking may be enabled for a group of uplink carriers within the set of uplink carriers, where the first uplink carrier may be absent from the group of uplink carriers.

In some examples of the method, apparatuses, and non-transitory computer-readable medium described herein, the control message may be configured per cell-group, or per uplink control channel group, or a combination thereof.

In some examples of the method, apparatuses, and non-transitory computer-readable medium described herein, receiving the first uplink grant may include operations, features, means, or instructions for receiving a downlink assignment index in the first uplink grant, and where performing the uplink shared channel transmission includes encoding the uplink shared channel transmission irrespective of the downlink assignment index.

Some examples of the method, apparatuses, and non-transitory computer-readable medium described herein may further include operations, features, means, or instructions for ignoring the downlink assignment index in the first uplink grant based on the piggybacking status for the first uplink carrier.

In some examples of the method, apparatuses, and non-transitory computer-readable medium described herein, the downlink assignment index in the first uplink grant may be fixed at a preconfigured value based on the piggybacking status for the first uplink carrier.

Some examples of the method, apparatuses, and non-transitory computer-readable medium described herein may further include operations, features, means, or instructions for determining a codebook size for the uplink control transmission on the second uplink carrier based on the downlink assignment index in the first uplink grant.

Some examples of the method, apparatuses, and non-transitory computer-readable medium described herein may further include operations, features, means, or instructions for receiving a second uplink grant that indicates a second uplink shared channel transmission occasion on the second uplink carrier, the second uplink grant including a downlink assignment index, and determining a codebook size for the uplink control transmission on the second uplink carrier based on the downlink assignment index of the second uplink grant.

In some examples of the method, apparatuses, and non-transitory computer-readable medium described herein, a downlink assignment index may be absent from the first uplink grant.

In some examples of the method, apparatuses, and non-transitory computer-readable medium described herein, aperiodic or semi-persistent channel state information transmissions on the first uplink carrier may be disabled based on the piggybacking status for the first uplink carrier.

In some examples of the method, apparatuses, and non-transitory computer-readable medium described herein, an uplink shared channel indication field in the first uplink grant may be set to a bit value of 1 based on a channel state information occasion overlapping with the uplink shared channel occasion.

Some examples of the method, apparatuses, and non-transitory computer-readable medium described herein may further include operations, features, means, or instructions for transmitting aperiodic or semi-persistent channel state information transmissions on the first uplink carrier during channel state information occasions that may be orthogonal in time to uplink control information transmissions by the UE based on the piggybacking status for the first uplink carrier.

Some examples of the method, apparatuses, and non-transitory computer-readable medium described herein may further include operations, features, means, or instructions for receiving a control message scheduling an aperiodic or semi-persistent channel state information transmission on the first uplink carrier during a channel state information occasion that overlaps in time with the uplink shared channel occasion.

Some examples of the method, apparatuses, and non-transitory computer-readable medium described herein may further include operations, features, means, or instructions for dropping the aperiodic or semi-persistent channel state information transmission on the first uplink carrier based on the piggybacking status for the first uplink carrier and the channel state information occasion overlapping in time with the uplink shared channel occasion, and performing a persistent channel state information transmission on the second uplink carrier.

Some examples of the method, apparatuses, and non-transitory computer-readable medium described herein may further include operations, features, means, or instructions for dropping a persistent channel state information transmission on the second uplink carrier based on the piggybacking status for the first uplink carrier and the channel state information occasion overlapping in time with the uplink shared channel occasion, and performing the aperiodic or semi-persistent channel state information transmission on the first uplink carrier during the uplink control channel occasion.

Some examples of the method, apparatuses, and non-transitory computer-readable medium described herein may further include operations, features, means, or instructions for piggybacking a persistent channel state information transmission on the first uplink carrier based on the piggybacking status and the channel state information occasion overlapping in time with the uplink shared channel occasion.

In some examples of the method, apparatuses, and non-transitory computer-readable medium described herein, a minimum uplink shared transmission preparation time of the first uplink carrier remains fixed and irrespective of other carriers based on the piggybacking status.

In some examples of the method, apparatuses, and non-transitory computer-readable medium described herein, a minimum uplink shared transmission preparation time of the first uplink carrier may be based on the piggybacking status, an uplink shared transmission preparation time associated with the second uplink carrier, and a minimum subcarrier spacing (SCS) configuration used for scheduling an uplink control channel transmission overlapping in time with the uplink shared channel occasion.

A method of wireless communication at a base station is described. The method may include transmitting to a UE a piggybacking status for a first uplink carrier of a set of uplink carriers configured for the UE, transmitting a first uplink grant that indicates an uplink shared channel occasion on the first uplink carrier, where the uplink shared channel occasion overlaps in time with an uplink control channel occasion associated with uplink control information for a downlink transmission from the base station, and receiving, based on the piggybacking status for the first uplink carrier, an uplink shared channel transmission on the first uplink carrier during the uplink shared channel occasion and a uplink control transmission of the uplink control information on a second uplink carrier of the set of uplink carriers during the uplink control channel occasion.

An apparatus for wireless communication at a base station is described. The apparatus may include a processor, memory coupled with the processor, and instructions stored in the memory. The instructions may be executable by the processor to cause the apparatus to transmit to a UE a piggybacking status for a first uplink carrier of a set of uplink carriers configured for the UE, transmit a first uplink grant that indicates an uplink shared channel occasion on the first uplink carrier, where the uplink shared channel occasion overlaps in time with an uplink control channel occasion associated with uplink control information for a downlink transmission from the base station, and receive, based on the piggybacking status for the first uplink carrier, an uplink shared channel transmission on the first uplink carrier during the uplink shared channel occasion and a uplink control transmission of the uplink control information on a second uplink carrier of the set of uplink carriers during the uplink control channel occasion.

Another apparatus for wireless communication at a base station is described. The apparatus may include means for transmitting to a UE a piggybacking status for a first uplink carrier of a set of uplink carriers configured for the UE, transmitting a first uplink grant that indicates an uplink shared channel occasion on the first uplink carrier, where the uplink shared channel occasion overlaps in time with an uplink control channel occasion associated with uplink control information for a downlink transmission from the base station, and receiving, based on the piggybacking status for the first uplink carrier, an uplink shared channel transmission on the first uplink carrier during the uplink shared channel occasion and a uplink control transmission of the uplink control information on a second uplink carrier of the set of uplink carriers during the uplink control channel occasion.

A non-transitory computer-readable medium storing code for wireless communication at a base station is described. The code may include instructions executable by a processor to transmit to a UE a piggybacking status for a first uplink carrier of a set of uplink carriers configured for the UE, transmit a first uplink grant that indicates an uplink shared channel occasion on the first uplink carrier, where the uplink shared channel occasion overlaps in time with an uplink control channel occasion associated with uplink control information for a downlink transmission from the base station, and receive, based on the piggybacking status for the first uplink carrier, an uplink shared channel transmission on the first uplink carrier during the uplink shared channel occasion and a uplink control transmission of the uplink control information on a second uplink carrier of the set of uplink carriers during the uplink control channel occasion.

In some examples of the method, apparatuses, and non-transitory computer-readable medium described herein, transmitting the piggybacking status for the first uplink carrier may include operations, features, means, or instructions for transmitting a control message including an indication that uplink control information piggybacking may be disabled for the first uplink carrier.

In some examples of the method, apparatuses, and non-transitory computer-readable medium described herein, transmitting the piggybacking status for the first uplink carrier may include operations, features, means, or instructions for transmitting a control message including an indication that uplink control information piggybacking may be disabled for a group of uplink carriers within the set of uplink carriers, where the group of uplink carriers includes the first uplink carrier.

In some examples of the method, apparatuses, and non-transitory computer-readable medium described herein, the group of uplink carriers may be grouped according to one or more of: frequency range, frequency band, TA group, cell group, PUCCH group, or UE.

In some examples of the method, apparatuses, and non-transitory computer-readable medium described herein, transmitting the piggybacking status for the first uplink carrier may include operations, features, means, or instructions for transmitting a control message including an indication that uplink control information piggybacking may be enabled for a group of uplink carriers within the set of uplink carriers, where the first uplink carrier may be absent from the group of uplink carriers.

In some examples of the method, apparatuses, and non-transitory computer-readable medium described herein, transmitting the first uplink grant may include operations, features, means, or instructions for transmitting a downlink assignment index in the first uplink grant, where the uplink shared channel transmission may be encoded irrespective of the downlink assignment index.

In some examples of the method, apparatuses, and non-transitory computer-readable medium described herein, the downlink assignment index in the first uplink grant may be fixed at a value of 0 based on the piggybacking status for the first uplink carrier.

In some examples of the method, apparatuses, and non-transitory computer-readable medium described herein, a codebook size for the uplink control transmission on the second uplink carrier may be based on the downlink assignment index in the first uplink grant.

Some examples of the method, apparatuses, and non-transitory computer-readable medium described herein may further include operations, features, means, or instructions for transmitting a second uplink grant that indicates a second uplink shared channel transmission occasion on the second uplink carrier, the second uplink grant including a downlink assignment index, where a codebook size for the uplink control transmission on the second uplink carrier may be based on the downlink assignment index of the second uplink grant.

In some examples of the method, apparatuses, and non-transitory computer-readable medium described herein, a downlink assignment index may be absent from the first uplink grant.

Some examples of the method, apparatuses, and non-transitory computer-readable medium described herein may further include operations, features, means, or instructions for disabling aperiodic or semi-persistent channel state information transmissions on the first uplink carrier disabled based on the piggybacking status for the first uplink carrier.

In some examples of the method, apparatuses, and non-transitory computer-readable medium described herein, an uplink shared channel indication field in the first uplink grant may be set to a bit value of 1 based on the channel state information occasion overlapping with the uplink shared channel occasion.

Some examples of the method, apparatuses, and non-transitory computer-readable medium described herein may further include operations, features, means, or instructions for receiving aperiodic or semi-persistent channel state information transmissions on the first uplink carrier during channel state information occasions that may be orthogonal in time to uplink control information transmissions by the UE based on the piggybacking status for the first uplink carrier.

Some examples of the method, apparatuses, and non-transitory computer-readable medium described herein may further include operations, features, means, or instructions for transmitting a control message scheduling an aperiodic or semi-persistent channel state information transmission on the first uplink carrier during a channel state information occasion that overlaps in time with the uplink shared channel occasion.

Some examples of the method, apparatuses, and non-transitory computer-readable medium described herein may further include operations, features, means, or instructions for receiving a persistent channel state information transmission on the second uplink carrier, where the aperiodic or semi-persistent channel state information transmission may be dropped on the first uplink carrier based on the piggybacking status for the first uplink carrier and the channel state information occasion overlapping in time with the uplink shared channel occasion.

Some examples of the method, apparatuses, and non-transitory computer-readable medium described herein may further include operations, features, means, or instructions for receiving the aperiodic or semi-persistent channel state information transmission on the first uplink carrier, where a persistent channel state information transmission may be dropped on the second uplink carrier based on the piggybacking status for the first uplink carrier and the channel state information occasion overlapping in time with the uplink shared channel occasion.

In some examples of the method, apparatuses, and non-transitory computer-readable medium described herein, a persistent channel state information transmission may be piggybacked on the first uplink carrier based on the piggybacking status and the channel state information occasion overlapping in time with the uplink shared channel occasion.

In some examples of the method, apparatuses, and non-transitory computer-readable medium described herein, a minimum uplink shared transmission preparation time of the first uplink carrier remains fixed and irrespective of other carriers based on the piggybacking status.

In some examples of the method, apparatuses, and non-transitory computer-readable medium described herein, a minimum uplink shared transmission preparation time of the first uplink carrier may be based on the piggybacking status, an uplink shared transmission preparation time associated with the second uplink carrier, and a minimum SCS configuration used for scheduling an uplink control channel transmission overlapping in time with the uplink shared channel occasion.

BRIEF DESCRIPTION OF THE DRAWINGS

FIGS. 3 through 7D illustrate examples of carrier aggregation (CA) schemes that support simultaneous feedback information and uplink shared channel transmissions in accordance with aspects of the present disclosure.

DETAILED DESCRIPTION

Figure 1:
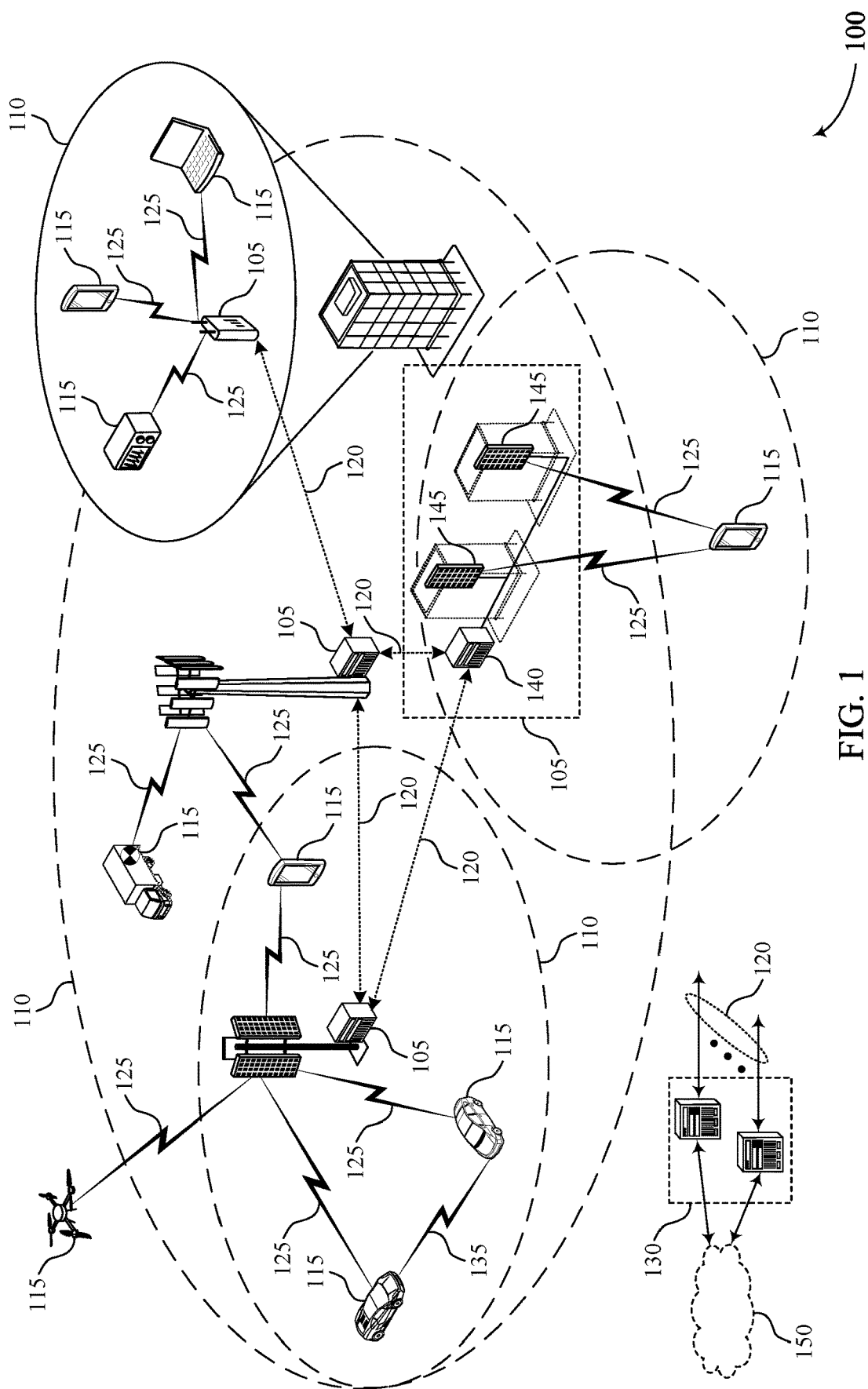
FIG. 1 illustrates an example of a system for wireless communications that supports simultaneous feedback information and uplink shared channel transmissions in accordance with aspects of the present disclosure.

A user equipment (UE) may transmit feedback information to a base station based on successful or unsuccessful reception and decoding of a downlink transmission from the base station. A base station may initially schedule resources for a downlink transmission in a physical downlink shared channel (PDSCH) from the base station by transmitting a downlink grant to the UE indicating the resources. The UE may then monitor the resources, and may transmit uplink control information (e.g., feedback information) based on a successful or unsuccessful reception of the downlink transmission. The UE may transmit the uplink control information (e.g., feedback information) in a physical uplink control channel (PUCCH) transmission to the base station. For example, the UE may receive an uplink grant scheduling hybrid automatic repeat request (HARQ) feedback in a PUCCH.

In some cases, the UE may also receive an uplink grant scheduling other transmissions (e.g., data transmissions) in a physical uplink shared channel (PUSCH). In some cases, the PUCCH may be scheduled for a time overlapped with a PUSCH in time. The overlap may be symbol-level (e.g., the PUCCH and a PUSCH are concurrently scheduled in one or more symbols in time) or slot-level (e.g., the PUCCH and a PUSCH are scheduled in a same slot). In such cases, the UE may use the PUSCH to transmit feedback information, rather than transmitting the feedback information in the overlapped PUCCH. For example, the UE may "piggyback" uplink control information (UCI) (e.g., HARQ feedback, periodic channel state information (P-CSI)) on the PUSCH. In other examples, a UE may receive an uplink grant scheduling a PUSCH transmission that overlaps in time with scheduled PUCCH. In such cases, the UE may similarly piggyback (e.g., multiplex) UCI associated with the PUCCH transmission onto the PUSCH (e.g., and the UE may drop the PUCCH as to avoid simultaneous PUCCH-PUSCH transmission).

According to the techniques described herein, wireless communications systems may support simultaneous PUCCH-PUSCH transmission. For example, wireless communications systems may support and enable simultaneous PUCCH-PUSCH across two or more carriers. In some cases, to efficiently support simultaneous PUCCH-PUSCH, a carrier configured for a PUSCH transmission may further be configured to disable communication of control information via the carrier (e.g., a carrier configured for PUSCH in a simultaneous PUCCH-PUSCH scenario may be configured as a data only carrier or a non-piggyback carrier). For example, wireless communications systems may configure (e.g., via radio resource control (RRC) signaling) simultaneous PUCCH-PUSCH across two or more carriers, where piggybacking of feedback information on uplink shared channel transmission may be disabled. In other words, wireless communications systems may configure simultaneous PUCCH-PUSCH such that feedback information (e.g., HARQ feedback, P-CSI) of PUCCH may not be piggybacked (e.g., multiplexed) on the PUSCH.

For instance, for some uplink carrier aggregation (CA) scenarios (e.g., for inter-frequency range (inter-FR) CA, inter-band CA, CA across carriers with different subcarrier spacing (SCS), CA in License Assisted Access (LAA) systems, etc.) disabling UCI piggybacking on PUSCH for some uplink carriers may provide for more efficient communications. Configuring simultaneous PUCCH-PUSCH and disabling UCI piggybacking on PUSCH for some uplink carriers may allow utilization of some secondary cells (SCells) for data only, which may provide for more efficient handling of control information (e.g., improved HARQ procedures), improved data throughput (e.g., on PUSCH), decoupling operations of two uplink carriers, etc.

Aspects of the disclosure are initially described in the context of wireless communications systems. Aspects are the described with respect to CA schemes and a process flow. Aspects of the disclosure are further illustrated by and described with reference to apparatus diagrams, system diagrams, and flowcharts that relate to simultaneous feedback information and uplink shared channel transmissions.

FIG. 1 illustrates an example of a wireless communications system 100 that supports simultaneous feedback information and uplink shared channel transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using CA or multi-carrier operation. A UE 115 may be configured with multiple downlink component carriers and one or more uplink component carriers according to a CA configuration. CA may be used with both frequency division duplexing (FDD) and time division duplexing (TDD) component carriers.

In some examples (e.g., in a CA configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ LAA, LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a CA configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As discussed herein, wireless communications system 100 may support simultaneous PUCCH-PUSCH transmission by UEs 115. For example, wireless communications system 100 may support and enable simultaneous PUCCH-PUSCH across two or more carriers. In some cases, to efficiently support simultaneous PUCCH-PUSCH, a carrier configured for a PUSCH transmission may further be configured to disable control information (e.g., a carrier configured for PUSCH in a simultaneous PUCCH-PUSCH scenario may be configured as a data only carrier or non-piggyback carrier). For example, wireless communications system 100 may configure (e.g., via RRC signaling) simultaneous PUCCH-PUSCH across two or more carriers, where piggybacking of feedback information on uplink shared channel transmission may be disabled. In other words, wireless communications system 100 may configure simultaneous PUCCH-PUSCH such that feedback information (e.g., HARQ feedback, P-CSI) of PUCCH may not be piggybacked (e.g., multiplexed) on the PUSCH (e.g., as the PUCCH and PUSCH may be transmitted simultaneously). Configuring UEs 115 with simultaneous PUCCH-PUSCH and disabling UCI piggybacking on PUSCH for some uplink carriers may allow utilization of some SCells for data only, which may provide for more efficient handling of control information (e.g., improved HARQ procedures), improved data throughput (e.g., on PUSCH), etc.

Figure 2:
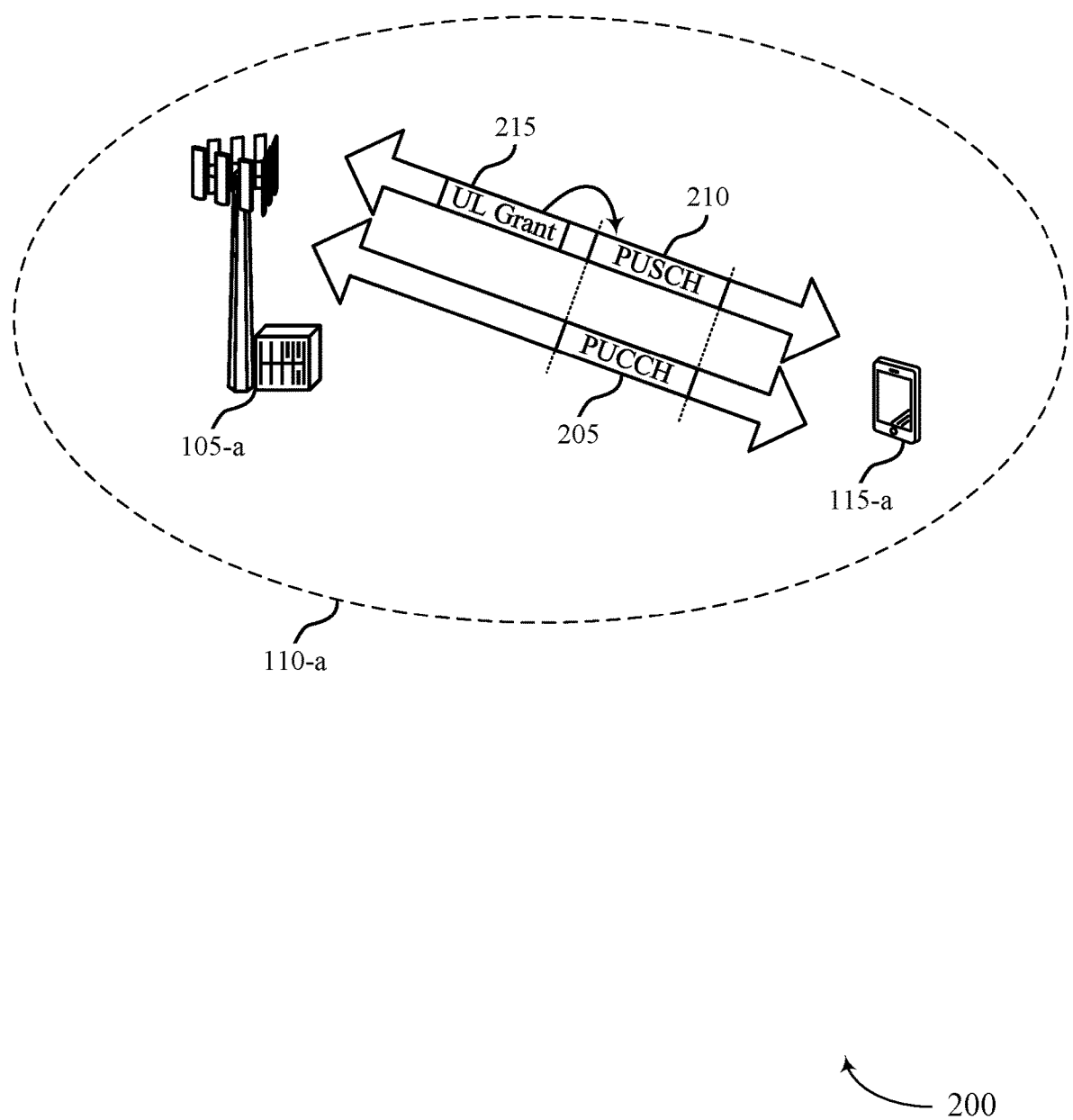
FIG. 2 illustrates an example of a wireless communications system that supports simultaneous feedback information and uplink shared channel transmissions in accordance with aspects of the present disclosure.

FIG. 2 illustrates an example of a wireless communications system 200 that supports simultaneous feedback information and uplink shared channel transmissions in accordance with aspects of the present disclosure. In some examples, wireless communications system 200 may implement aspects of wireless communication system 100. UE 115-a may be an example of a UE 115 as described with respect to FIG. 1, and base station 105-a may be an example of a base station 105 as described with respect to FIG. 1. Base station 105-a may serve a coverage area 110-a, which may include UE 115-a. In some cases, base station 105-a and UE 115-a may communicate using various CA schemes. For example, UE 115-a may communicate with base station 105-a using an uplink CA configuration (e.g., which may include, for example, two uplink carriers in the example illustrated by FIG. 2). As discussed herein, wireless communications system 200 may support simultaneous transmission of PUCCH transmission 205 and PUSCH transmission 210 (e.g., which may be referred to as simultaneous PUCCH-PUSCH).

Base station 105-a may transmit an uplink grant 215 to UE 115-a. Uplink grant 215 may schedule a set of uplink resources for UE 115-a to use to transmit an uplink transmission (e.g., a PUSCH transmission 210). In some cases, a UE 115-a may transmit a scheduling request (SR) to base station 105-a, prompting base station 105-a to transmit the uplink grant 215 to UE 115-a. For example, UE 115-a may identify pending (e.g., buffered) data to be transmitted to base station 105-a, and UE 115-a may, accordingly, transmit an SR to base station 105-a to request uplink resources for transmission of the pending data. In response to the SR, base station 105-a may transmit uplink grant 215 to UE 115-a, and UE 115-a may transmit uplink data (e.g., PUSCH transmission 210) to the base station 105-a using time and frequency resources indicated by the uplink grant 215.

In some cases, base station 105-a may transmit a downlink grant (e.g., downlink assignment, scheduling assignment) to UE 115-a. The downlink grant may include resources indicating a downlink transmission, such as a PDSCH message, from base station 105-a. UE 115-a may then monitor the indicated resources for the PDSCH message, and attempt to decode the message. Based on monitoring the resources and attempted decoding, UE 115-a may generate feedback information for the PDSCH. The feedback information may be transmitted by UE 115-a in an uplink message. For example, UE 115-a may transmit HARQ feedback, such as an acknowledgment (ACK), or a negative acknowledgment (NACK). An ACK may be transmitted based on a successful reception and decoding of a message from base station 105-a, and a NACK may be transmitted based on unsuccessful reception or decoding of the PDSCH transmission. The feedback information may be transmitted in a PUCCH scheduled by an uplink grant transmitted to UE 115-a by base station 105-a (e.g., which may be included in PDSCH, may be included in the original downlink grant, may be a separate uplink grant, etc.).

In some scenarios, UE 115-a may piggyback feedback information (e.g., an ACK/NACK for a downlink shared channel transmission) in PUSCH transmission 210. For example, in some cases, a PUCCH transmission 205 may be scheduled for a time overlapped with a PUSCH transmission 210. Therefore, UE 115-a may use the PUSCH transmission 210 to transmit feedback information. For example, UE 115-a may piggyback UCI on the PUSCH transmission 210 (e.g., HARQ feedback, P-CSI, etc. may be multiplexed onto PUSCH and may be transmitted via PUSCH transmission 210) and UE 115-a may refrain from transmitting the PUCCH. In other examples, UE 115-a may receive an uplink grant 215 scheduling a PUSCH transmission 210 that overlaps in time with scheduled PUCCH transmission 205 (e.g., as illustrated in the example of FIG. 2). In such cases, UE 115-a may similarly piggyback (e.g., multiplex) UCI associated with the PUCCH transmission 205 onto the PUSCH transmission 210 (e.g., and UE 115-a may drop the PUCCH transmission 205 as to avoid simultaneous PUCCH-PUSCH transmission).

However, in some scenarios it may be beneficial for wireless communications systems to support simultaneous PUCCH-PUSCH transmission. According to the techniques described herein, wireless communications system 200 may support simultaneous PUCCH-PUSCH transmission. For example, wireless communications system 200 may support and enable simultaneous PUCCH-PUSCH across two or more carriers. In some cases, to efficiently support simultaneous PUCCH-PUSCH, a carrier configured for a PUSCH transmission 210 may further be configured to disable communication of PUCCH control information via the carrier (e.g., a carrier configured for PUSCH in a simultaneous PUCCH-PUSCH scenario may be configured as a data only carrier). For example, wireless communications system 200 may configure (e.g., via RRC signaling) simultaneous PUCCH-PUSCH across two or more carriers, where piggybacking of feedback information on PUSCH transmission 210 may be disabled (e.g., and PUCCH transmission 205 may be transmitted simultaneously, or at least partially overlap in time, with PUSCH transmission 210). In other words, wireless communications system 200 may configure simultaneous PUCCH-PUSCH such that feedback information (e.g., HARQ feedback, P-CSI) of PUCCH may not be piggybacked (e.g., multiplexed) on the PUSCH.

In some examples, wireless communications system 200 may illustrate inter-FR CA, inter-band CA, CA across carriers with different SCS, CA in an LAA system, etc., where disabling UCI piggybacking on PUSCH for some uplink carriers of the CA configuration may provide for more efficient communications. For instance, in some cases a CA configuration may include two carriers on different bands or frequency ranges, may include two carriers with different SCS, etc. where multiplexing UCI may be computationally complex, may be time consuming, etc. As such, disabling UCI piggy backing on a carrier configured for PUSCH may provide for reduced computational complexity, reduced latency, etc. (e.g., as, in some cases, the UCI may be transmitted simultaneously via PUCCH transmission 205).

As another example, in some cases a CA configuration may include one or more carriers in the unlicensed band (e.g., in examples where wireless communications system 200 illustrates an LAA system). In such scenarios, UE 115-a may perform listen-before-talk (LBT) procedures prior to accessing the medium. As such, reliance on UCI piggybacking for communicating feedback information may be inefficient, as the UE 115-a may or may not ultimately win access to the medium for PUSCH transmission 210 on a carrier in the unlicensed band. The described techniques may be implemented to disable UCI piggybacking on such carriers in the unlicensed band (e.g., which may provide for improved reliability of UCI via PUCCH transmissions 205, may provide for improved throughput data only carriers via PUSCH transmissions 210, etc.).

As described herein, simultaneous PUCCH-PUSCH may be configured via RRC signaling. For example, RRC configuration may enable simultaneous PUCCH-PUSCH across carriers and, once configured for a particular PUSCH, multiplexing of UCI from PUCCH may be disabled for the particular PUSCH configured for simultaneous PUCCH-PUSCH. In some cases, RRC signaling for simultaneous PUCCH-PUSCH configuration may include configuration of data only carriers (e.g., where UCI piggybacking is disabled) on a per carrier basis, on a per group of uplink carriers basis, on a per cell-group/PUCCH-group basis, etc.

For example, in some cases, a 1-bit RRC parameter per uplink carrier may configure (e.g., inform UE 115-a) which uplink carrier, or which uplink carriers, are configured as uplink data only carriers (e.g., where an uplink data only carrier may refer to an uplink carrier where UCI piggybacking on PUSCH is disabled such that PUSCH does not multiplex HARQ-ACK/P-CSI in the PUCCH). Once configured, UCI of the PUCCH will not be multiplexed on a PUSCH transmission 210 on the uplink carrier. For supplemental uplink (SUL), one serving cell may have two uplink carriers (uplink (UL)+SUL), in which case the 1-bit RRC parameter may be per uplink/SUL carrier. As an example, in a CA scenario where five uplink carriers are configured for uplink CA and two carriers out of the five carriers are configured with SUL, RRC signaling may include a seven bit sequence for per uplink carrier configuration of whether or not the carriers are uplink data only carriers (e.g., as the five carriers, two with SUL, total seven carriers which may be configured as data only carriers). For SUL, one serving cell may have two uplink carriers (UL+SUL), in which case the 1 bit RRC parameter may be per uplink serving cell (i.e., 1 bit per set of UL+SUL). As an example, in a CA scenario where five uplink carriers are configured for uplink CA and two carriers out of the five carriers are configured with SUL, RRC signaling may include a five bit sequence per uplink serving cell configuration to indicate whether the carriers are uplink data only carriers (e.g., as the five serving cells, total five serving cells which may be configured as data only carriers).

In some examples, a 1-bit RRC parameter per group of uplink carriers may configure (e.g., inform UE 115-a) which group of uplink carriers is the group of uplink data only carriers. Once configured, UCI of the PUCCH may not be multiplexed on any PUSCH transmissions 210 in the group of uplink carriers indicated by the 1-bit RRC parameter. Per group of uplink carriers can be per band, per FR, per timing advance (TA)-group, per cell-group/PUCCH-group, per UE 115, etc. In some cases, such may reduce signaling overhead for configuration of uplink data only carriers for simultaneous PUCCH-PUSCH configuration.

In some examples, a 1-bit RRC parameter per cell-group/PUCCH-group may configure (e.g., inform UE 115-a) which SCells (e.g., which SCells in the bands other than the band for P(S)Cell/PUCCH-SCell in the cell-group/PUCCH-group) are the uplink data only carrier(s). Once configured, UCI of the PUCCH may not be multiplexed on a PUSCH in any of the SCell(s) that is in different band from the P(S)Cell/PUCCH-SCell. As an example, in a CA scenario where five uplink carriers are configured in a cell group, if the RRC parameter corresponding to the cell group is set (e.g., toggled, indicates data only configuration, etc.), one carrier is the PCell, one carrier is SCell in the same band as the PCell (e.g., and thus is not configured as data only), and the remaining three carriers are in other band (e.g., and the remaining three carriers are thus configured as data only carriers). In other words, simultaneous PUCCH-PUSCH may be supported across bands (e.g., simultaneous PUCCH-PUSCH may not be supported within the same band) and, as such, RRC signaling may configure simultaneous PUCCH-PUSCH across bands or across frequency ranges per cell-group accordingly.

In some examples, a 1-bit RRC parameter per UE 115 may configure (e.g., inform UE 115-a) which SCells (e.g., which SCells in the bands other than the band for PCell) are the uplink data only carrier(s). Once configured, the UCI of the PUCCH may not be multiplexed on a PUSCH in any of the SCell(s) that are in different bands from the PCell. As an example, in a CA scenario where five uplink carriers are configured in a cell group, if the RRC parameter corresponding to the cell group is set (e.g., toggled, indicates data only configuration), one carrier is the PCell, one carrier is SCell in the same band as the PCell (e.g., and thus is not configured as data only), and the remaining three carriers are in the other band (e.g., and the remaining three carriers are thus configured as data only carriers). Simultaneous PUCCH-PUSCH may be supported across bands (e.g., simultaneous PUCCH-PUSCH may not be supported within the same band) and, as such, RRC signaling may configure simultaneous PUCCH-PUSCH across bands or across frequency ranges per cell-group accordingly.

In some cases, one or more fields (e.g., a total downlink assignment index (T-DAI) field) may exist in uplink downlink control information (DCI) in layer 1 (L1) signaling, such as in an uplink grant, that indicates the number of UCI bits (e.g., HARQ ACK/NACK bits) UE 115-a may multiplex on the PUSCH. In some implementations, the T-DAI field may not be removed. For example, in cases where piggybacking is disabled for a PUSCH across one or more carriers, the T-DAI field may indicate a number of bits UE 115-a may multiplex on the PUSCH. As such, UE 115-a may be configured to ignore the T-DAI field. In some cases, the UE may be configured to handle the T-DAI field in RRC configuration.

For example, UE 115-a may identify a T-DAI field in uplink grant 215. In some cases, UE 115-a may be configured to ignore the T-DAI field. In some cases, UE 115-a may ignore the T-DAI field regardless of whether the feedback information is scheduled to be transmitted or multiplexed on a second uplink carrier. As such, UE 115-a may encode the PUSCH irrespective of the T-DAI. In cases where UE 115-a is configured with multiple uplink carriers, where one or more carriers are reserved for data-only and one or more other carriers may support UCI piggybacking, UE 115-a may receive uplink DCI scheduling a PUSCH that does not have piggybacking disabled. The DCI scheduling the piggybacking supporting carrier may include a T-DAI field that UE 115-a may not ignore. As such, the T-DAI field on the uplink DCI scheduling the piggybacking carrier may indicate the HARQ feedback codebook size for transmitting HARQ feedback (e.g., UCI) in a PUSCH on the piggybacking carrier.

In some cases, the T-DAI field may be fixed at a preconfigured value (e.g., preconfigured value of zero). In some implementations, UE 115-a may be configured to do nothing with the T-DAI field if the T-DAI field is fixed to the preconfigured value. In some cases, the T-DAI field may be fixed to a preconfigured value regardless of whether the feedback information is scheduled to be transmitted or multiplexed on a second uplink carrier. In cases where UE 115-a is configured with multiple uplink carriers, where one or more carriers are reserved for data-only and one or more other carriers may support UCI piggybacking, UE 115-a may receive uplink DCI scheduling a PUSCH that does not have piggybacking disabled. The DCI scheduling the piggybacking supporting carrier may include a T-DAI field that may not be fixed to the preconfigured value. As such, the T-DAI field on the uplink DCI scheduling the piggybacking carrier may indicate the HARQ feedback codebook size for transmitting HARQ feedback (e.g., UCI) in a PUSCH on the piggybacking carrier.

In some cases, the T-DAI field may not be included in a DCI scheduling a data-only uplink carrier. In cases where UE 115-a is configured with multiple uplink carriers, where one or more carriers are reserved for data-only and one or more other carriers may support UCI piggybacking, UE 115-a may receive uplink DCI scheduling a PUSCH that does not have piggybacking disabled. The DCI scheduling the piggybacking supporting carrier may include a T-DAI field. As such, the T-DAI field on the uplink DCI scheduling the piggybacking carrier may indicate the HARQ feedback codebook size for transmitting HARQ feedback (e.g., UCI) in a PUSCH on the piggybacking carrier.

In some cases, the T-DAI may not be altered by base station 105-a or UE 115-a. Rather, base station 105-a may use the T-DAI field to indicate HARQ feedback codebook size, where the HARQ feedback may be included in a PUCCH, or a PUSCH that has UCI piggybacking enabled. For example, UE 115-a may be scheduled with one PUSCH transmission on an uplink carrier with piggybacking disabled, where the T-DAI field of the DCI scheduling the PUSCH on the uplink data carrier may indicate that UE 115-a may have a non-zero size HARQ feedback (e.g., HARQ ACK/NACK) size. UE 115-a may transmit the HARQ feedback using a PUCCH, where the HARQ feedback codebook size may be determined based on the T-DAI field value in the uplink or downlink DCI. As such, the T-DAI field included in the DCI scheduling a data-only PUSCH, may be interpreted by UE 115-a as a HARQ feedback codebook size indicator that UE 115-a may use to configure the HARQ feedback in the PUCCH.

Figure 3:
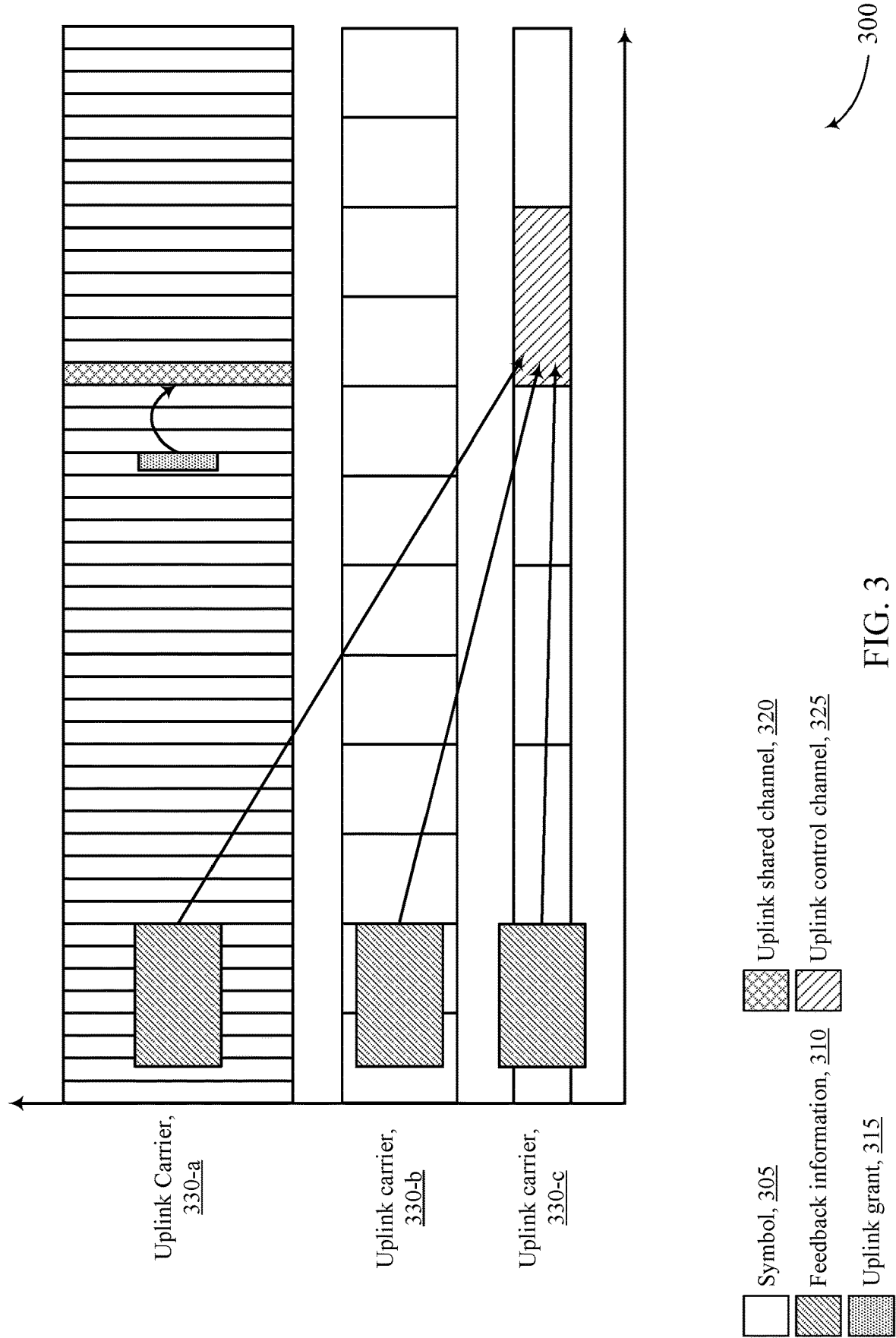

FIG. 3 illustrates an example of a CA scheme 300 that supports simultaneous feedback information and uplink shared channel transmissions in accordance with aspects of the present disclosure. In some examples, CA scheme 300 may implement aspects of wireless communication system 100. CA scheme 300 may be implemented by UEs that may be examples of UEs as described with respect to FIGS. 1 and 2, and base stations that may examples of base stations as described with respect to FIGS. 1 and 2. In some cases, a base station and UE may communicate using various CA schemes. For example, a UE may communicate with a base station using an uplink CA configuration (e.g., which may include, for example, three uplink carriers in the example illustrated by FIG. 3). As discussed herein, CA scheme 300 may support simultaneous transmission of PUCCH transmission and PUSCH transmission (e.g., which may be referred to as simultaneous PUCCH-PUSCH).

A UE may be configured with three uplink carriers 330. In some cases, one of the three carriers may be a primary cell (PCell) (e.g., uplink carrier 330-c), another carrier may be a first secondary cell (SCell) (e.g., uplink carrier 330-b), and the third carrier may be a second SCell (e.g., uplink carrier 330-a). As shown here, different carriers may have different carrier spacings and symbol lengths. For example, uplink carrier 330-c may be a PCell with 15 kHz carrier spacing, uplink carrier 330-b may be a first SCell with 30 kHz carrier spacing, and uplink carrier 330-a may be a second SCell with 120 kHz carrier spacing. In some cases, the higher the SCS, the larger the frequency band allocated to the uplink carrier 330, the lower the time allocated to each symbol 305 in the uplink carrier 330. In some cases, the uplink carriers 330 may be a part of different frequency bands. For example, uplink carriers 330-b and 330-c may be a part of a first frequency band (e.g., sub-6, mmW) and uplink carrier 330-a may be a part of a second frequency band (e.g., sub-6, mmW), different than the first frequency band.

In some cases, a UE may determine feedback information 310 such as HARQ ACK/NACK, or channel state information (CSI), or a combination thereof for one or more of the uplink carriers 330. The UE may receive an uplink grant 315 that configures a future uplink shared channel 320 transmission that is scheduled at the same time an uplink control channel transmission 325 is scheduled. In some wireless communications systems, though, a UE may not be configured to simultaneously transmit feedback information 310 on an uplink control channel 325 (e.g., PUCCH) and an uplink shared channel 320 (e.g., PUSCH). As such, rather than transmitting the feedback information 310 in the uplink control channel 325 as would be done if the uplink shared channel 320 was not scheduled during the same time as the uplink control channel 325 was scheduled, the UE may instead multiplex (e.g., piggyback) the feedback information 310 with the uplink shared channel 320 and drop the uplink control channel 325.

In some cases, network reliability and efficiency may be increased by enabling a feedback information 310 (e.g., UCI, HARQ ACK/NACK) disabling scheme. For example, a UE may receive a feedback information 310 piggybacking status for one or more uplink carriers via RRC signaling, which may disable piggybacking on the one or more uplink carriers, or enable piggybacking on the one or more uplink carriers, or a combination thereof to enable simultaneous PUCCH-PUSCH transmissions by the UE. In some cases, the RRC signaling may indicate disabled piggybacking on a per-uplink carrier 330 basis, a per-group of uplink carriers 330 basis, a per-cell-group basis, or a per-PUCCH group basis, or a combination thereof. For example, the RRC signaling may individually indicate one or more uplink carriers 330 that are disabled for piggybacking. Additionally or alternatively, the RRC signaling may indicate a group of uplink carriers 330 that are disabled for piggyback based on frequency band, frequency range, TA group, per cell-group, per PUCCH group, or per UE. Additionally or alternatively, the RRC signaling may indicate per group of cells or group of PUCCHs an SCell or multiple SCells in the bands other than the band associated with the PCell that are data only carriers.

For example, the UE may receive a piggybacking status (e.g., feedback information piggybacking status, uplink control information piggybacking status) via an RRC parameter that indicates one or more uplink carriers 330 are configured as a data-only channel. The RRC signaling may indicate UCI piggybacking is disabled for uplink carrier 330-a, uplink carrier 330-b, or a combination thereof, where uplink carriers 330-a and 330-b may be in different frequency bands. As such, feedback information 310 associated with uplink carriers 330-a, 330-b, and 330-c, such as HARQ ACK/NACK and CSI (e.g., periodic-CSI), may not be transmitted on uplink carrier 330-a during uplink shared channel 320.

In some implementations, rather than multiplexing an uplink shared channel 320 with feedback information 310, the feedback information 310 may be carried by uplink control channel 325, where the uplink control channel 325 may be scheduled at the same time an uplink shared channel 320 is scheduled by an uplink grant 315. For example, feedback information 310 regarding one or more symbols 305 on one or more carriers, such as feedback information 310 relating to uplink carriers 330-a, 330-b, and 330-c may be transmitted by uplink control channel 325. The uplink control channel 325, carrying the feedback information 310, may be transmitted at the same time an uplink shared channel 320 is transmitted. As such, the UE may be configured to simultaneously transmit an uplink control channel 325 and an uplink shared channel 320 on different frequency bands (e.g., sub-6, mmW).

Figure 4:
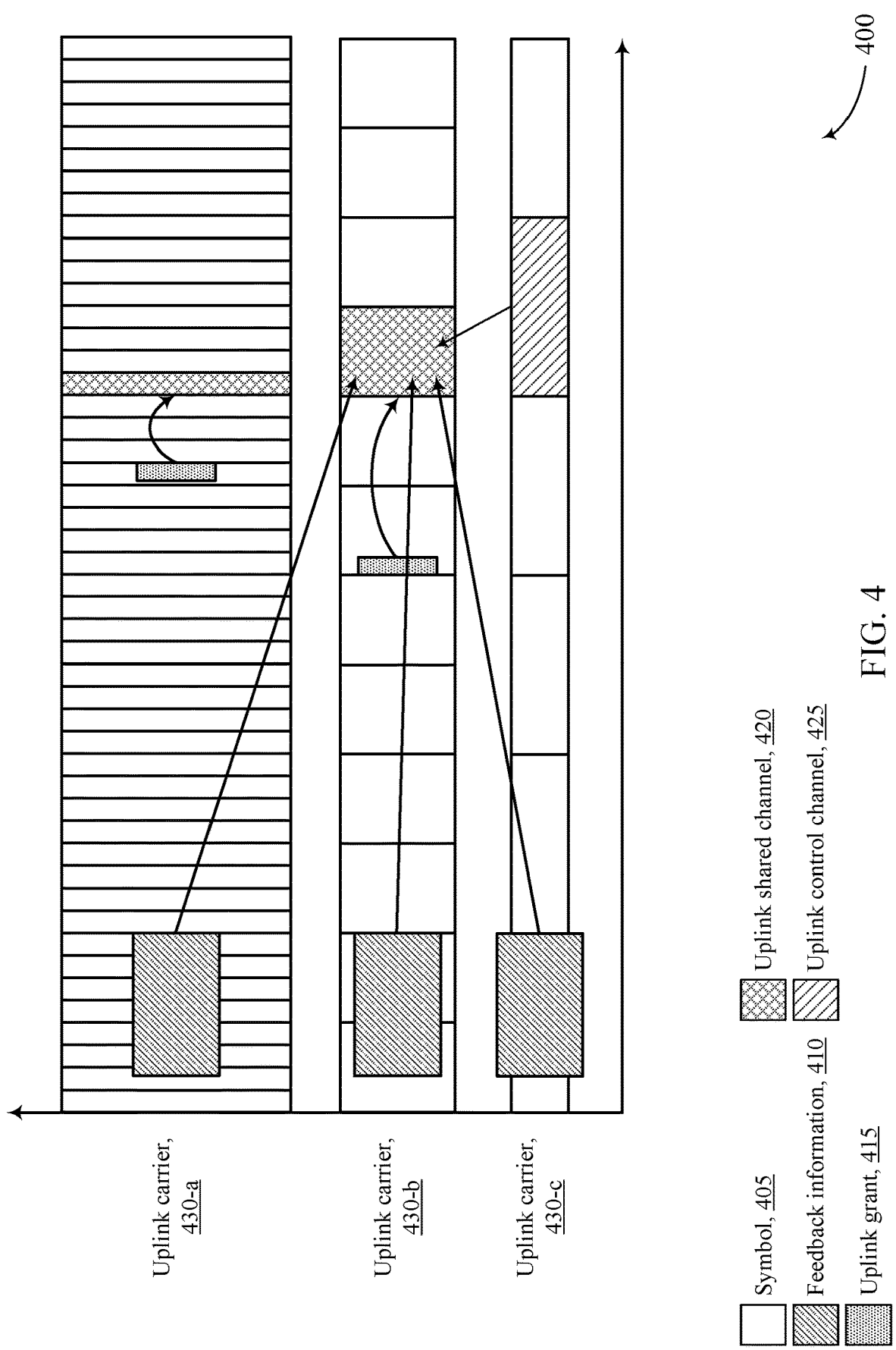

FIG. 4 illustrates an example of a CA scheme 400 that supports simultaneous feedback information and uplink shared channel transmissions in accordance with aspects of the present disclosure. In some examples, CA scheme 400 may implement aspects of wireless communication system 100. CA scheme 400 may be implemented by UEs that may be examples of UEs as described with respect to FIGS. 1 and 2, and base stations that may examples of base stations as described with respect to FIGS. 1 and 2. A UE may be configured for CA using a first uplink carrier 430-c that is a PCell, a second uplink carrier 430-b that is a first SCell, and a third uplink carrier 430-a that is a second SCell, as described above with respect to FIG. 2.

In some cases, a UE may be configured to simultaneously transmit feedback information 410 and uplink shared channels 420 across different frequency bands and a UE may be configured to multiplex UCI with an uplink shared channel 420 on one of the frequency bands. For example, the UE may receive a piggybacking status via an RRC parameter that indicates uplink carrier 430-a in a second frequency band (e.g., sub-6, mmW) is configured as a data-only channel where UCI piggybacking is disabled for uplink carrier 430-a. As such, feedback information 410 associated with uplink carriers 430-a, 430-b, and 430-c, such as HARQ ACK/NACK and CSI (e.g., P-CSI), may not be transmitted on uplink carrier 430-a during uplink shared channel 420.

In some implementations, a UE may be configured to piggyback a portion or all of the feedback information 410 from each of the uplink carriers 430 in uplink shared channel 420 of uplink carrier 430-b, where piggybacking may refer to multiplexing UCI onto an uplink shared channel 420 transmission. In some cases, the feedback information 410 that would be carried in an uplink control channel 425 of uplink carrier 430-c may be piggybacked with uplink shared channel 420 of uplink carrier 430-*b*. In such cases, the UE may transmit the two uplink shared channels 420 on uplink carriers 430-*a*, and 430-*b* and the uplink control channel 425 on uplink carrier 430-*c* simultaneously. In some cases, if the feedback information 410 is piggybacked on uplink shared channel 420 on uplink carrier 430-*b*, the uplink control channel 425 on uplink carrier 430-*c* may be dropped. In some cases, the feedback information 410 may be piggybacked based on uplink carriers 430-*b* and 430-*c* being in the same frequency band.

For example, feedback information 410 regarding one or more symbols 405 on one or more uplink carriers 430, such as feedback information 410 relating to uplink carriers 430-*a*, 430-*b*, and 430-*c* may be transmitted by uplink shared channel 420 on uplink carrier 430-*b*.

Figure 5:
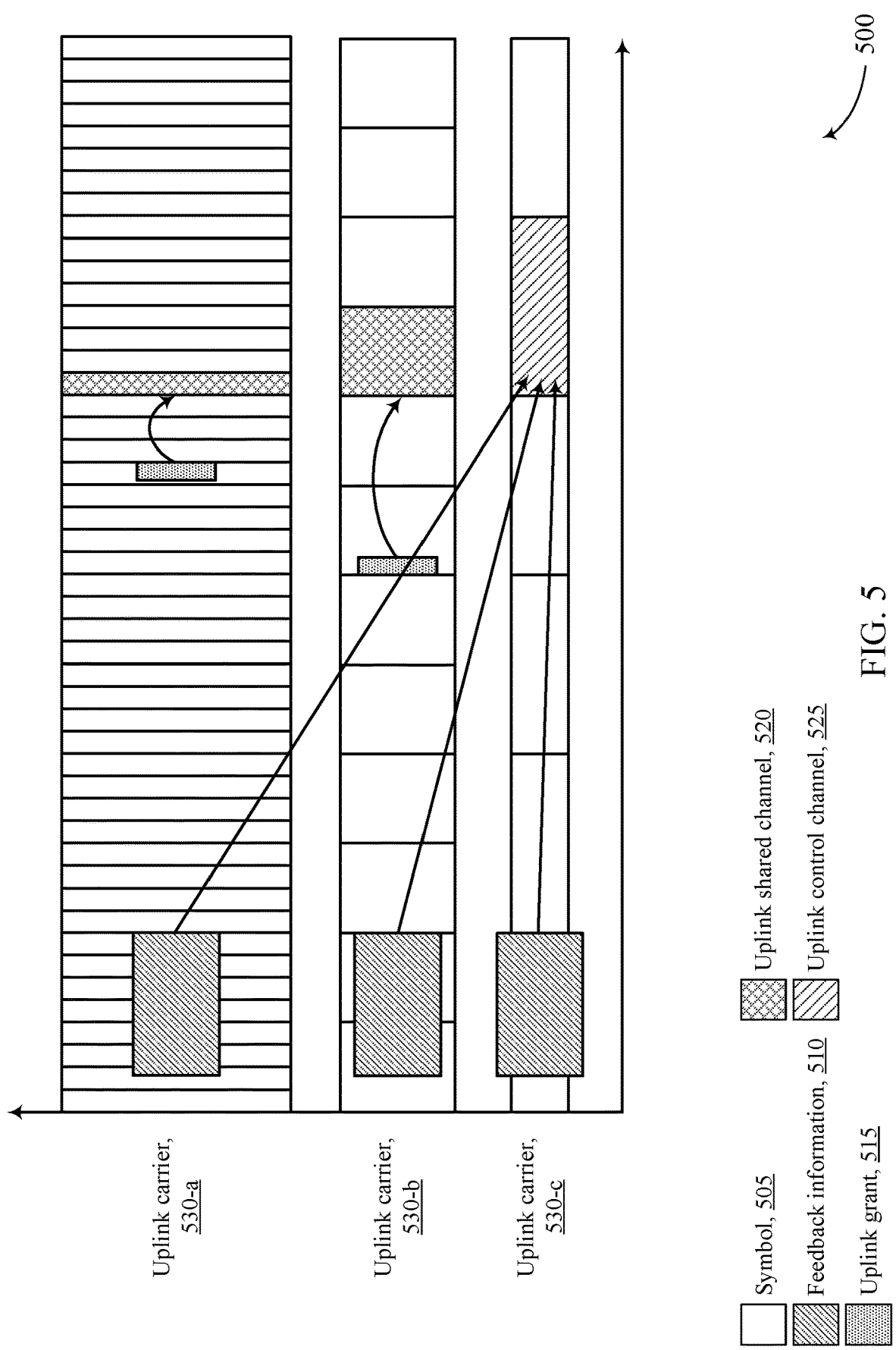

FIG. 5 illustrates an example of a CA scheme 500 that supports simultaneous feedback information and uplink shared channel transmissions in accordance with aspects of the present disclosure. In some examples, CA scheme 500 may implement aspects of wireless communication system 100. CA scheme 500 may be implemented by UEs that may be examples of UEs as described with respect to FIGS. 1 and 2, and base stations that may examples of base stations as described with respect to FIGS. 1 and 2. A UE may be configured for CA using a first uplink carrier 530-*c* that is a PCell, a second uplink carrier 530-*b* that is a first SCell, and a third uplink carrier 530-*a* that is a second SCell, as described above with respect to FIG. 2.

In some cases, a UE may be configured to simultaneously transmit feedback information 510 and uplink shared channels 520 across different frequency bands. For example, the UE may receive a piggybacking status via an RRC parameter that indicates uplink carrier 530-*a* in a second frequency band and uplink carrier 530-*b* in a first frequency band are configured as a data-only channels where UCI piggybacking is disabled for uplink carriers 530-*a* and 530-*b*. As such, feedback information 510 associated with uplink carriers 530-*a*, 530-*b*, and 530-*c*, such as HARQ ACK/NACK and CSI (e.g., P-CSI), may not be transmitted on uplink carrier 530-*a* during uplink shared channel 520 and uplink carrier 530-*b* during uplink shared channel 520.

In some implementations, rather than piggybacking an uplink shared channel 520 on uplink carrier 530-*a* with feedback information 510, the feedback information 510 may be carried by uplink control channel 525 on uplink carrier 530-*c* of a first frequency band, where the uplink control channel 525 may be scheduled at the same time an uplink shared channel 520 is scheduled by an uplink grant 515. For example, feedback information 510 regarding one or more symbols 505 on one or more uplink carriers 530, such as feedback information 510 relating to uplink carriers 530-*a*, 530-*b*, and 530-*c* may be transmitted by uplink control channel 525 on uplink carrier 530-*c*. The uplink control channel 525, carrying the feedback information 510, may be transmitted at the same time one or more uplink shared channels 520 are transmitted. As such, the UE may be configured to simultaneously transmit an uplink control channel 525 and an uplink shared channel 520. In such cases, the UE may transmit the two uplink shared channels 520 on uplink carriers 530-*a*, and 530-*b* and the uplink control channel 525 on uplink carrier 530-*c* simultaneously. In some cases, the feedback information 510 may be piggybacked based on uplink carriers 530-*b* and 530-*c* being in the same frequency band.

Figure 6:
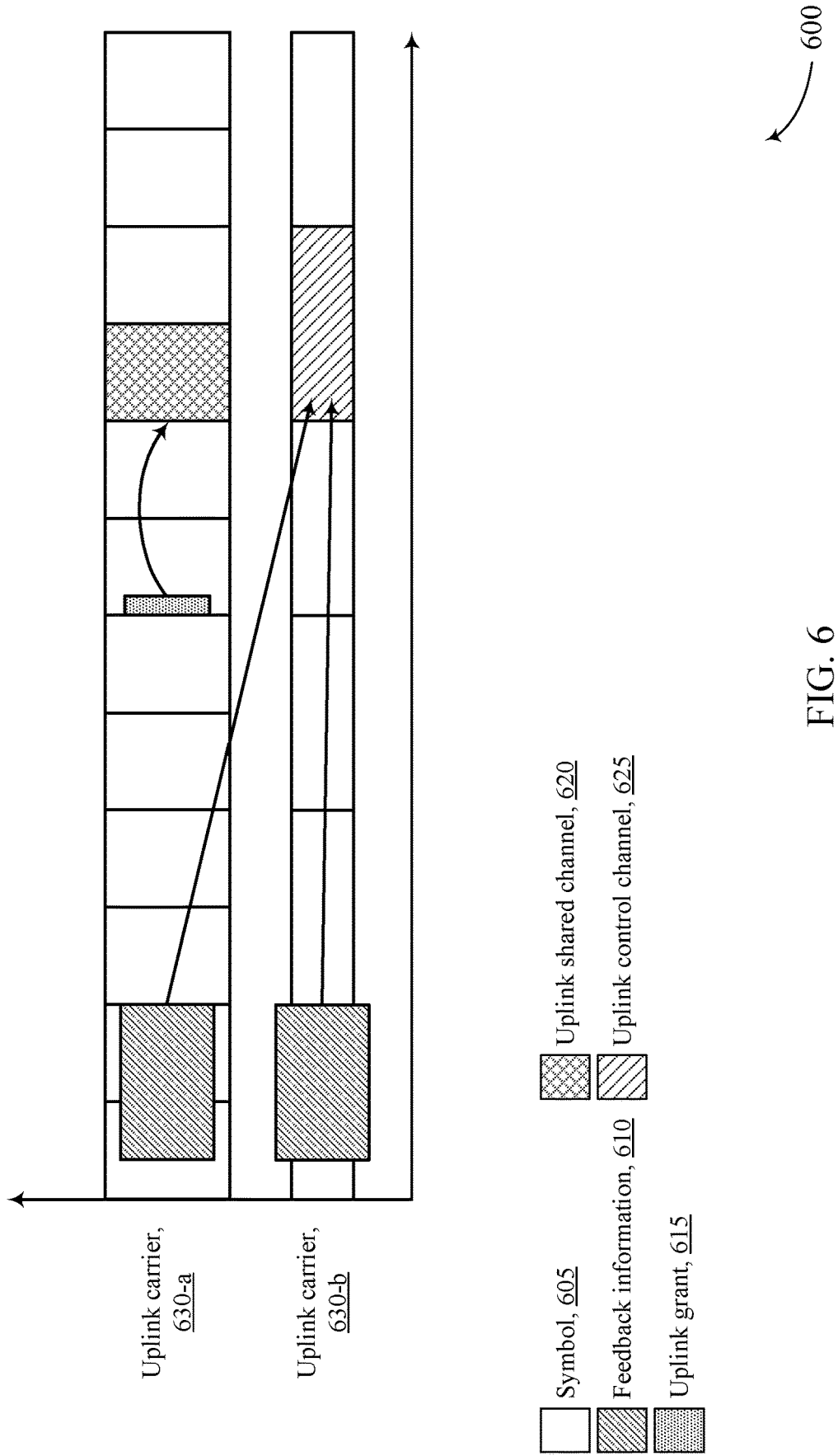

FIG. 6 illustrates an example of a CA scheme 600 that supports simultaneous feedback information and uplink shared channel transmissions in accordance with aspects of the present disclosure. In some examples, CA scheme 600 may implement aspects of wireless communication system 100. CA scheme 600 may be implemented by UEs that may be examples of UEs as described with respect to FIGS. 1 and 2, and base stations that may examples of base stations as described with respect to FIGS. 1 and 2. A UE may be configured for CA using a first uplink carrier 630-*b* that is a PCell, and a second uplink carrier 630-*a* that is a first SCell, as described above with respect to FIG. 2.

In some cases, a UE may be configured to simultaneously transmit feedback information 610 and an uplink shared channel 620 across the same frequency band. For example, the UE may receive a piggybacking status via an RRC parameter that indicates uplink carrier 630-*a* is configured as a data-only channel where UCI piggybacking is disabled for uplink carriers 630-*a*. As such, feedback information 610 associated with uplink carriers 630-*a*, and 630-*b*, such as HARQ ACK/NACK and CSI (e.g., P-CSI), may not be transmitted on uplink carrier 630-*a* during uplink shared channel 620.

In some implementations, rather than piggybacking an uplink shared channel 620 on uplink carrier 630-*a* with feedback information 610, the feedback information 610 may be carried by uplink control channel 625 on uplink carrier 630-*b*, where the uplink control channel 625 may be scheduled at the same time an uplink shared channel 620 is scheduled by an uplink grant 615. For example, feedback information 610 regarding one or more symbols 605 on one or more uplink carriers 630, such as feedback information 610 relating to uplink carriers 630-*a*, and 630-*b* may be transmitted by uplink control channel 625 on uplink carrier 630-*b*. The uplink control channel 625, carrying the feedback information 610, may be transmitted at the same time one or more uplink shared channels 620 are transmitted. As such, the UE may be configured to simultaneously transmit an uplink control channel 625 and an uplink shared channel 620 in the same frequency band.

In some implementations, aperiodic CSI (A-CSI), or semi-persistent CSI (SP-CSI), or a combination thereof may be triggered by uplink DCI that schedules an uplink shared channel 620, where the A-CSI/SP-CSI may be transmitted in the uplink shared channel 620. In cases where UCI piggybacking is disabled for one or more uplink carriers 630, and uplink shared channels 620 and uplink control channels 625 are transmitted simultaneously, the A-CSI/SP-CSI transmitted in the uplink shared channel 620 may collide with feedback information 610 transmitted simultaneously in the uplink control channel 625. Additionally or alternatively, the uplink shared channel 620 may be configured as a data only channel and may not support piggybacking A-CSI/SP-CSI.

To prevent collisions, a UE may be configured such that A-CSI/SP-CSI is not activated for an uplink shared channel 620 on a data-only uplink carrier 630 such that A-CSI/SP-CSI may be disabled for a data only uplink carrier 630. For example, a CSI request field in a DCI may be associated with activated A-CSI. A UE or base station may configure the CSI request field in DCI to not activate the A-CSI for an uplink shared channel 620 on the data-only uplink carrier 630. In some cases, activation DCI may be associated with triggering SP-CSI and the base station or UE may configure the activation DCI with CRC scrambled by SP-CSI-RNTI such that the activation DCI may not activate SP-CSI. In some cases, an uplink grant 615 may include an UL-SCH field that may indicate whether uplink data will be carried on a PUSCH. In some cases, the UL-SCH field may be used to indicate that no data will be transmitted on the PUSCH and instead, A-CSI/SP-CSI may be transmitted on the PUSCH.

The UL-SCH field may be set to preconfigured value (e.g., 1) if A-CSI/SP-CSI should not be triggered. In some cases, a dynamic beta-offset field may indicate the code rate of the UCI on the PUSCH, if the uplink shared channel 620 is not configured as a data-only channel. As such the dynamic beta-offset file may control the code rate of the UCI and PUSCH. In cases where the PUSCH is scheduled on a data-only carrier, the dynamic beta-offset may be set to a fixed value (e.g., 0) so as not to indicate a code rate. Additionally or alternatively, the UE may be configured to ignore the dynamic beta-offset if the uplink carrier 630 associated with the dynamic beta-offset is configured as a data-only carrier. In some cases, the A-CSI/SP-CSI may be triggered for a PUSCH on uplink carrier 630 as the data-only carrier.

FIGS. 7A, 7B, 7C, and 7D illustrate examples of CA schemes 700, 701, 702, and 703 that support simultaneous feedback information and uplink shared channel transmissions in accordance with aspects of the present disclosure. In some examples, CA schemes 700, 701, 702, and 703 may implement aspects of wireless communication system 100. CA schemes 700, 701, 702, and 703 may be implemented by UEs that may be examples of UEs as described with respect to FIGS. 1 and 2, and base stations that may examples of base stations as described with respect to FIGS. 1 and 2. In some cases, a base station and UE may communicate using various CA schemes. For example, a UE may communicate with a base station using an uplink CA configuration (e.g., which may include, for example, at least two uplink carriers in the examples illustrated by FIGS. 7A, 7B, 7C, and 7D). As discussed herein, CA schemes 700, 701, 702, and 703 may support simultaneous transmission of PUCCH transmission and PUSCH transmission (e.g., which may be referred to as simultaneous PUCCH-PUSCH).

As described with reference to FIG. 6, an A-CSI/SP-CSI 715 may need to be appropriately configured relative to data-only carriers. In some cases, A-CSI/SP-CSI 715 may be triggered for a PUSCH on the uplink data carrier 705. In some cases, a base station may schedule uplink transmissions at a UE such that A-CSI/SP-CSI 715 on the PUSCH of the uplink data-only carrier and feedback information 730 (e.g., HARQ ACK/NACK, P-CSI, UCI) on the PUCCH or PUSCH of a non-data-only carrier do not overlap. In some cases, the PUSCH carrying the A-CSI/SP-CSI 715 may be scheduled such that the PUSCH does not overlap with the PUCCH/PUSCH carrying the feedback information 730.

In some implementations, the PUSCH of the data-only carrier with A-CSI/SP-CSI 715 and the PUCCH/PUSCH with the feedback information 730 collide as depicted in FIGS. 7A through 7D. For example, uplink carrier 705 may include a PUSCH on an SCell, and uplink carrier 710 may include a PUCCH on a PCell. The uplink carriers 705 and 710 may operate in the same frequencies bands, or different frequency bands. Uplink carrier 705 may include an A-CSI/SP-CSI and an uplink shared channel 720 (e.g., UL-SCH). Uplink carrier 710 may include a P-CSI 725 and feedback information 730 (e.g., HARQ ACK/NACK, UCI).

To mitigate the impact of the collision, and as depicted in FIG. 7A, the UE may drop A-CSI/SP-CSI 715 in uplink carrier 705 and the UE may transmit uplink carriers 705-*a* and 710-*a*. Additionally or alternatively, as depicted in FIG. 7B, the UE may drop the P-CSI 725 in uplink carrier 710-*b* and simultaneously transmit uplink carriers 705-*b* and 710-*b*. Additionally or alternatively, as depicted in FIG. 7C, the UE may drop the P-CSI 725 in uplink carrier 710-*c* and piggyback the feedback information 730 with the uplink shared channel 720 on uplink carrier 705-*c*. The UE may transmit uplink carrier 705-*c* and drop uplink carrier 710-*c*. In some cases, the UE may be configured with more than two uplink carriers as described with reference to FIGS. 3 through 5. As such, even though the UE may drop an uplink carrier and piggyback feedback information on a PUSCH, the UE may be configured with another uplink carrier such that UE may simultaneously transmit the piggybacked feedback information and one or more other PUSCH transmissions, PUCCH transmissions, or a combination thereof. Additionally or alternatively, as depicted in FIG. 7D, the UE may partially drop the P-CSI 725 in uplink carrier 710-*d* and may piggyback the remaining P-CSI 725 with the A-CSI/SP-CSI 715 on uplink carries 705-*d*. The UE may also piggyback the feedback information 730 with the uplink shared channel 720 on uplink carrier 705-*d*. The UE may transmit uplink carrier 705-*d* and drop uplink carrier 710-*d*. In some cases, the UE may be configured with more than two uplink carriers as described with reference to FIGS. 3 through 5. As such, even though the UE may drop an uplink carrier and piggyback feedback information on a PUSCH, the UE may be configured with another uplink carrier such that UE may simultaneously transmit the piggybacked feedback information and one or more other PUSCH transmissions, PUCCH transmissions, or a combination thereof.

In some cases, $T_{proc,2}$ is the minimum PUSCH preparation time for a PUSCH scheduled on an uplink data carrier, if the PUSCH does not carry feedback information. In some implementations, the minimum PUSCH preparation time may be irrespective of whether or how feedback information is piggybacked on other uplink carriers. In some cases, the minimum PUSCH preparation time for the PUSCH on an uplink carrier, that is not piggybacked with feedback information, may not be impacted by the processing timeline for other uplink carriers. In some implementations, the minimum processing timelines for other carriers (e.g., PDSCH processing preparation for PUSCH, CSI computation and preparation) may not be impacted by the PUSCH of another uplink data carrier.

In cases where a PUSCH scheduled on an uplink data carrier is configured to carry feedback information, as described with reference to FIGS. 7C and 7D, the minimum PUSCH preparation time may be based on the maximum $T_{proc,2}$ for any overlapped PUSCHs and based on the minimum SCS configuration. In some cases, the minimum SCS configuration may be a part of SCS configurations used for physical downlink control channel (PDCCH) scheduling the i-th PUSCH, i being an integer index, the PDCCHs scheduling the PDSCHs with corresponding HARQ ACK/NACK transmissions on a PUCCH which may be in the group of overlapping PUCCHs/PUSCHs described with reference to FIGS. 7A through 7B, and all PUSCHs in the group of overlapping PUCCHs and PUSCHs described with reference to FIGS. 7A through 7B.

Figure 8:
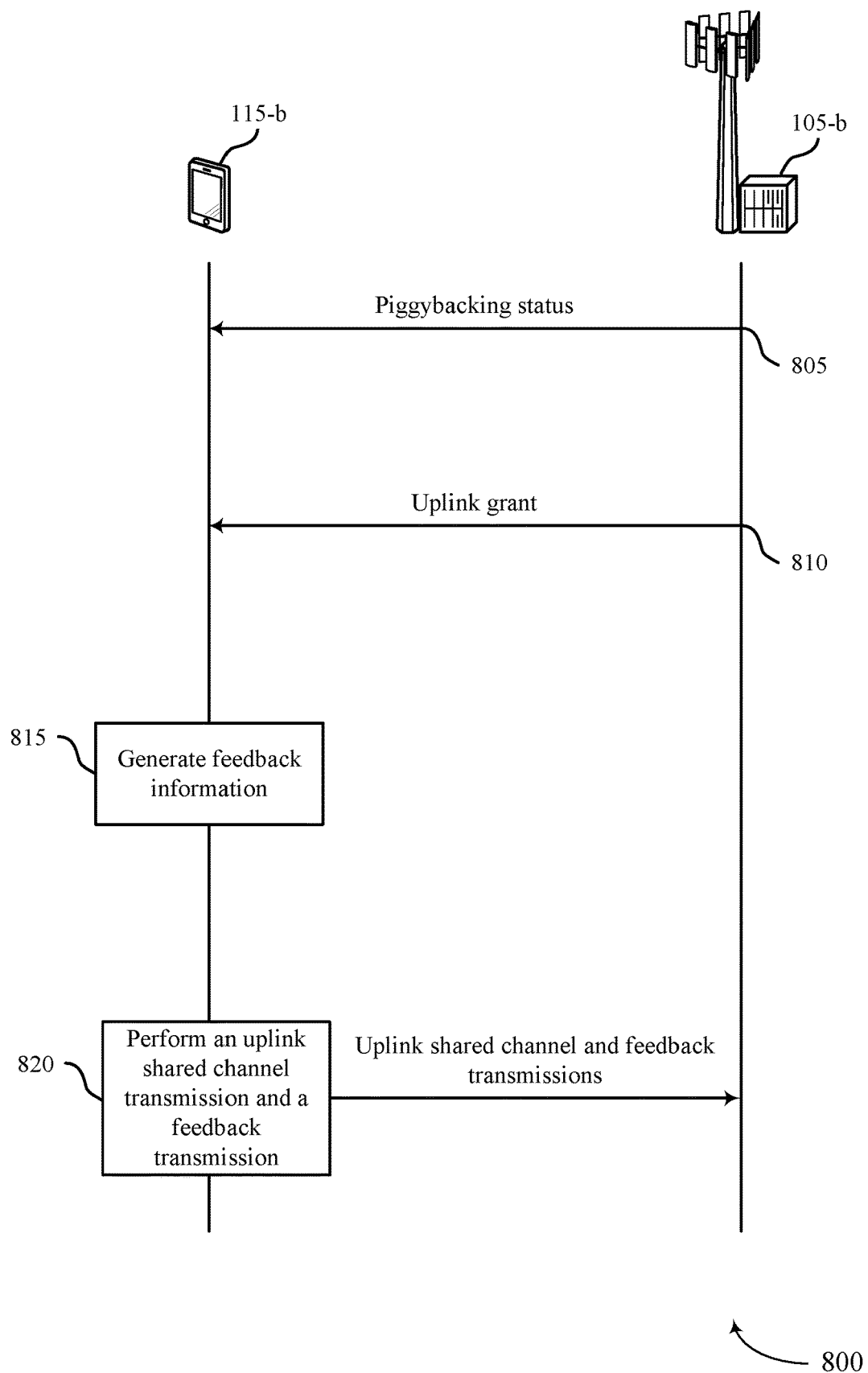
FIG. 8 illustrates an example of a process flow that supports simultaneous feedback information and uplink shared channel transmissions in accordance with aspects of the present disclosure.

FIG. 8 illustrates an example of a process flow 800 that supports simultaneous feedback information and uplink shared channel transmissions in accordance with aspects of the present disclosure. The process flow 800 may illustrate an example of a simultaneous feedback information transmission and shared channel transmission scheme. For example, UE 115-*b* may be configured to transmit feedback information and an uplink shared channel simultaneously in different subcarriers to base station 105-*b*. Base station 105-*b* and UE 115-*b* may be examples of the corresponding wireless devices described with reference to FIGS. 1 through 7. In some cases, instead of UE 115-*b* implementing the simultaneous transmission scheme, a different type of wireless device (e.g., a base station 105) may implement the simultaneous transmission scheme. Alternative examples of the following may be implemented, where some steps are performed in a different order than described or are not performed at all. In some cases, steps may include additional features not mentioned below, or further steps may be added.

At 805, UE 115-*b* may receive a piggybacking status for a first uplink carrier of a set of uplink carriers configured for UE 115-*b*. In some implementations, UE 115-*b* may receive a control message including an indication that uplink control information piggybacking (e.g., feedback information piggybacking) is disabled for the first uplink carrier. In some implementations, UE 115-*b* may receive a control message including an indication that uplink control information piggybacking is disabled for a group of uplink carriers within the set of uplink carriers, where the group of uplink carriers includes the first uplink carrier. In some implementations, UE 115-*b* may receive a control message including an indication that uplink control information piggybacking is enabled for a group of uplink carriers within the set of uplink carriers, where the first uplink carrier is absent from the group of uplink carriers, and where the control message is configured per cell-group, or per uplink control channel group, or a combination thereof.

At 810, UE 115-*b* may receive a first uplink grant that indicates an uplink shared channel occasion on the first uplink carrier. In some implementations, UE 115-*b* may receive a downlink assignment index in the first uplink grant, where performing the uplink shared channel transmission includes encoding the uplink shared channel transmission irrespective of the downlink assignment index.

At 815, UE 115-*b* may generate uplink control information (e.g., feedback information) for a downlink transmission from base station 105-*b*, where the uplink control information may be associated with an uplink control channel occasion that overlaps in time with the uplink shared channel occasion. In some cases, UE 115-*b* may select the second uplink carrier for the uplink control transmission based on the piggybacking status for the first uplink carrier and the uplink control channel occasion overlapping in time with the uplink shared channel occasion.

At 820, UE 115-*b* may perform, based on the piggybacking status for the first uplink carrier, an uplink shared channel transmission on the first uplink carrier during the uplink shared channel occasion and a uplink control transmission of the uplink control information on a second uplink carrier of the set of uplink carriers during the uplink control channel occasion. In some cases, UE 115-*b* may transmit the uplink shared channel transmission and the uplink control transmission to base station 105-*b*.

Figure 9:
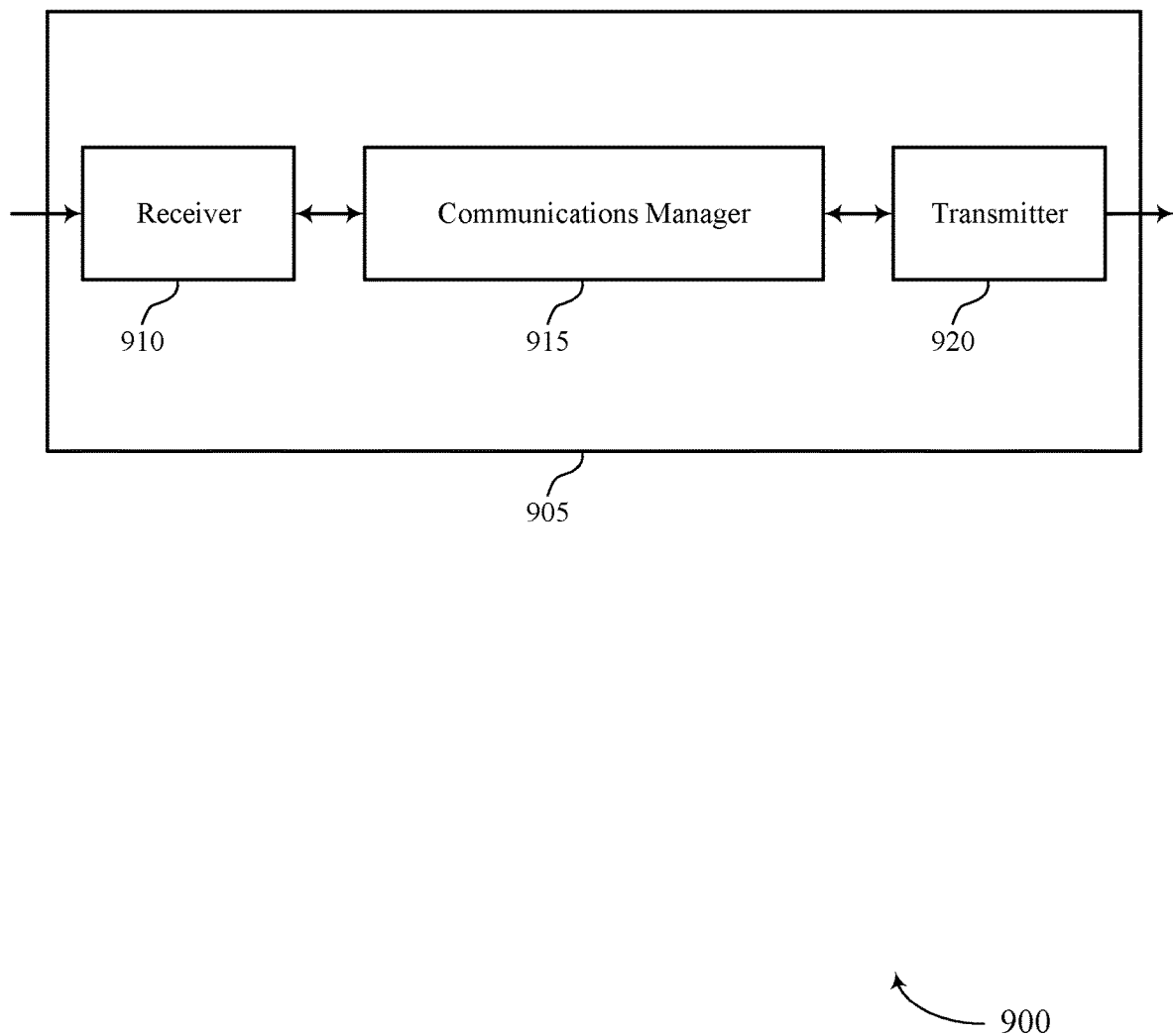
FIGS. 9 and 10 show block diagrams of devices that support simultaneous feedback information and uplink shared channel transmissions in accordance with aspects of the present disclosure.

FIG. 9 shows a block diagram 900 of a device 905 that supports simultaneous feedback information and uplink shared channel transmissions in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to simultaneous uplink control information (e.g., feedback information) and uplink shared channel transmissions, etc.). Information may be passed on to other components of the device 905. The receiver 910 may be an example of aspects of the transceiver 1220 described with reference to FIG. 12. The receiver 910 may utilize a single antenna or a plurality of antennas.

The communications manager 915 may receive a piggybacking status for a first uplink carrier of a plurality of uplink carriers configured for the UE, receive a first uplink grant that indicates an uplink shared channel occasion on the first uplink carrier, generate uplink control information for a downlink transmission from a base station, wherein the uplink control information is associated with an uplink control channel occasion that overlaps in time with the uplink shared channel occasion, and perform, based at least in part on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a plurality of antennas.

The communications manager 915 as described herein may be implemented to realize one or more potential advantages. One implementation may allow the device 905 to more efficiently and reliably transmit UCI to one or more base stations, and more specifically to disable UCI piggybacking on uplink shared channels in some scenarios. For example, the device 905 may receive a UCI piggybacking status from a base station and identify a configuration to use for transmitting feedback to a base station, based at least in part on the received piggybacking status.

Based on implementing the piggybacking status techniques as described herein, a processor of a UE 115 (e.g., controlling the receiver 910, the transmitter 920, or the transceiver 1220 as described with reference to FIG. 12)

may increase reliability and increase signaling efficiency in the communication of feedback because UCI piggybacking may be dynamically disabled based on the network. This increased reliability and signaling efficiency may result in improved throughput, reduced power consumption, and a reduction in signaling complexity.

Figure 10:
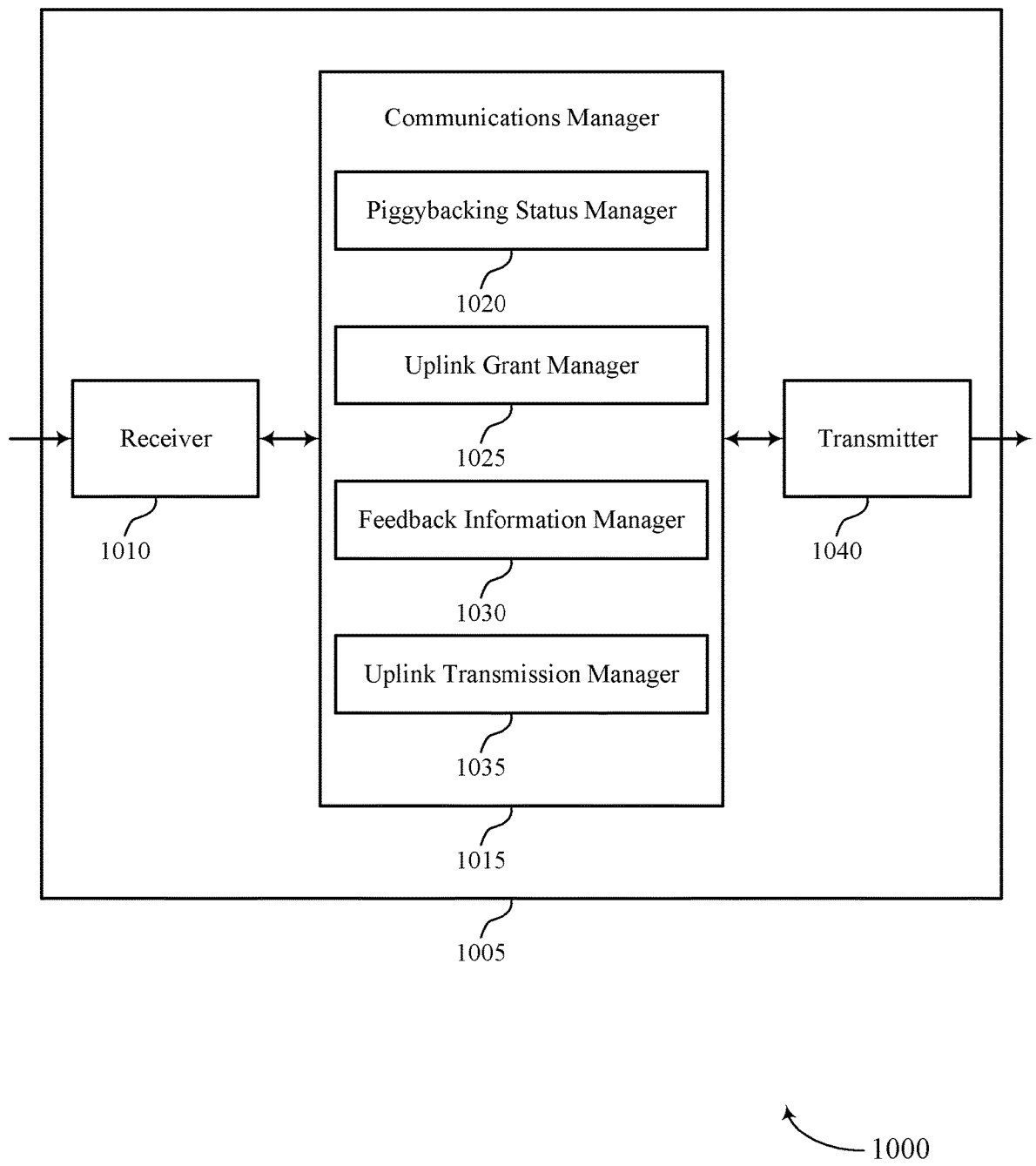

FIG. 10 shows a block diagram 1000 of a device 1005 that supports simultaneous feedback information and uplink shared channel transmissions in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to simultaneous uplink control information (e.g., feedback information) and uplink shared channel transmissions, etc.). Information may be passed on to other components of the device 1005. The receiver 1010 may be an example of aspects of the transceiver 1220 described with reference to FIG. 12. The receiver 1010 may utilize a single antenna or a plurality of antennas.

The communications manager 1015 may be an example of aspects of the communications manager 915 as described herein. The communications manager 1015 may include a piggybacking status manager 1020, an uplink grant manager 1025, a feedback information manager 1030, and an uplink transmission manager 1035. The communications manager 1015 may be an example of aspects of the communications manager 1210 described herein.

The piggybacking status manager 1020 may receive a piggybacking status for a first uplink carrier of a plurality of uplink carriers configured for the UE. The uplink grant manager 1025 may receive a first uplink grant that indicates an uplink shared channel occasion on the first uplink carrier. The feedback information manager 1030 may generate uplink control information for a downlink transmission from a base station, wherein the uplink control information is associated with an uplink control channel occasion that overlaps in time with the uplink shared channel occasion.

The uplink transmission manager 1035 may perform, based at least in part on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion. The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a plurality of antennas.

Figure 11:
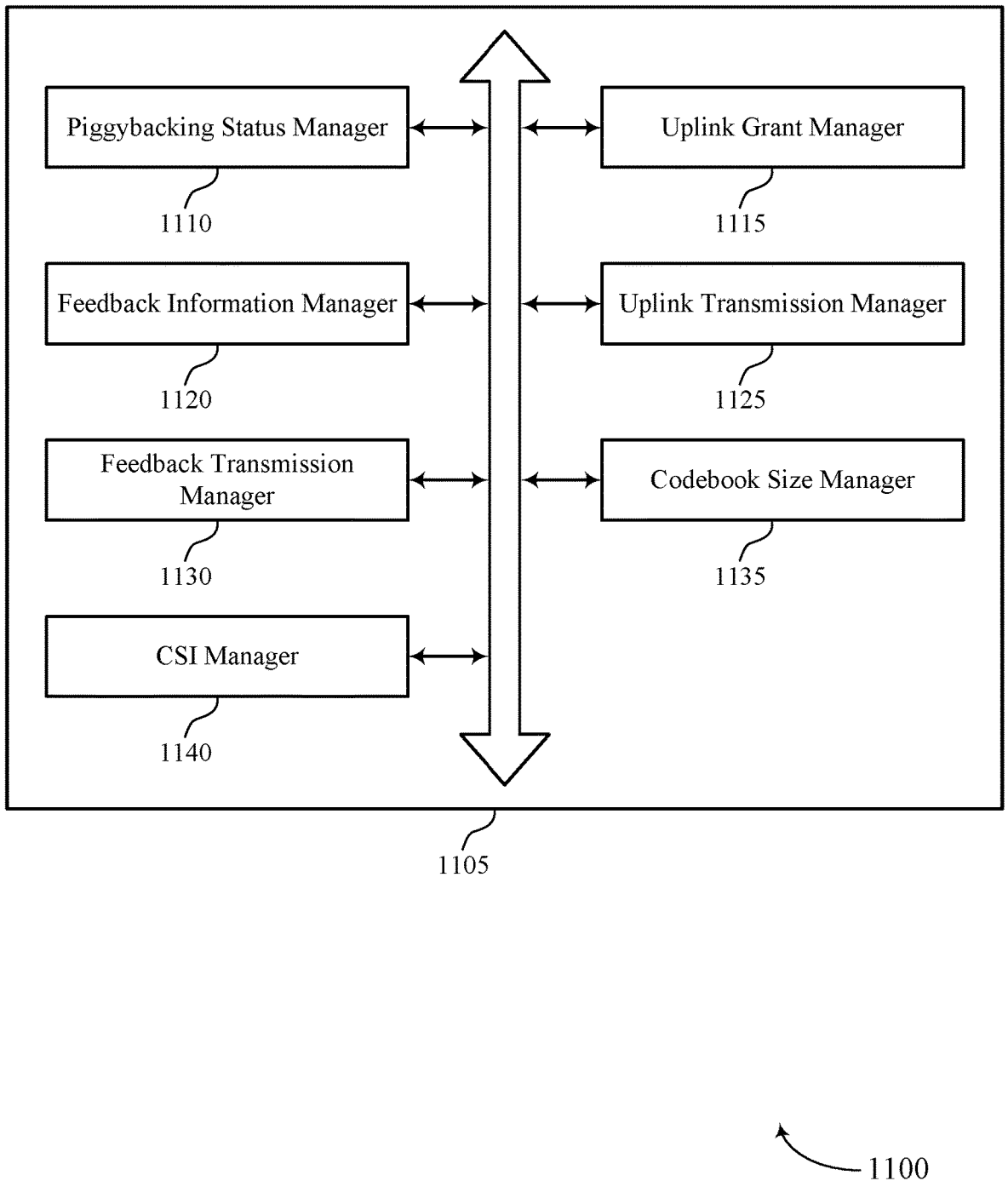
FIG. 11 shows a block diagram of a communications manager that supports simultaneous feedback information and uplink shared channel transmissions in accordance with aspects of the present disclosure.

FIG. 11 shows a block diagram 1100 of a communications manager 1105 that supports simultaneous feedback information and uplink shared channel transmissions in accordance with aspects of the present disclosure. The communications manager 1105 may be an example of aspects of a communications manager 915, a communications manager 1015, or a communications manager 1210 described herein. The communications manager 1105 may include a piggybacking status manager 1110, an uplink grant manager 1115, a feedback information manager 1120, an uplink transmission manager 1125, a feedback transmission manager 1130, a codebook size manager 1135, and a CSI manager 1140. Each of these modules may communicate, directly or indirectly, with one another (e.g., via one or more buses).

The piggybacking status manager 1110 may receive a piggybacking status for a first uplink carrier of a plurality of uplink carriers configured for the UE. In some examples, the piggybacking status manager 1110 may receive a control message including an indication that uplink control information piggybacking is disabled for the first uplink carrier. In some examples, receiving a control message including an indication that uplink control information piggybacking is disabled for a group of uplink carriers within the plurality of uplink carriers, wherein the group of uplink carriers includes the first uplink carrier. In some examples, the piggybacking status manager 1110 may frequency range, frequency band, TA group, cell group, PUCCH group, or UE. In some examples, the piggybacking status manager 1110 may receive a control message including an indication that uplink control information piggybacking is enabled for a group of uplink carriers within the plurality of uplink carriers, wherein the first uplink carrier is absent from the group of uplink carriers. In some cases, the control message is configured per cell-group, or per uplink control channel group, or a combination thereof.

The uplink grant manager 1115 may receive a first uplink grant that indicates an uplink shared channel occasion on the first uplink carrier. In some examples, the uplink grant manager 1115 may receive a downlink assignment index in the first uplink grant. In some examples, wherein performing the uplink shared channel transmission includes encoding the uplink shared channel transmission irrespective of the downlink assignment index. In some examples, the uplink grant manager 1115 may ignore the downlink assignment index in the first uplink grant based at least in part on the piggybacking status for the first uplink carrier.

In some examples, the uplink grant manager 1115 may receive a second uplink grant that indicates a second uplink shared channel transmission occasion on the second uplink carrier, the second uplink grant including a downlink assignment index. In some examples, the uplink grant manager 1115 may aperiodic or semi-persistent CSI transmissions on the first uplink carrier are disabled based at least in part on the piggybacking status for the first uplink carrier. In some cases, the downlink assignment index in the first uplink grant is fixed at a preconfigured value based at least in part on the piggybacking status for the first uplink carrier. In some cases, a downlink assignment index is absent from the first uplink grant. In some cases, an uplink shared channel indication field in the first uplink grant is set to a bit value of 1 based at least in part on a CSI occasion overlapping with the uplink shared channel occasion.

The feedback information manager 1120 may generate uplink control information for a downlink transmission from a base station, wherein the uplink control information is associated with an uplink control channel occasion that overlaps in time with the uplink shared channel occasion. The uplink transmission manager 1125 may perform, based at least in part on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion.

In some cases, a minimum uplink shared transmission preparation time of the first uplink carrier remains fixed and irrespective of other carriers based at least in part on the piggybacking status. In some cases, a minimum uplink shared transmission preparation time of the first uplink carrier is based at least in part on the piggybacking status, an uplink shared transmission preparation time associated with the second uplink carrier, and a minimum SCS configuration used for scheduling an uplink control channel transmission overlapping in time with the uplink shared channel occasion.

The feedback transmission manager 1130 may select the second uplink carrier for the uplink control transmission based at least in part on the piggybacking status for the first uplink carrier and the uplink control channel occasion overlapping in time with the uplink shared channel occasion. The codebook size manager 1135 may determine a codebook size for the uplink control transmission on the second uplink carrier based at least in part on the downlink assignment index in the first uplink grant. In some examples, the codebook size manager 1135 may determine a codebook size for the uplink control transmission on the second uplink carrier based at least in part on the downlink assignment index of the second uplink grant.

The CSI manager 1140 may transmit aperiodic or semi-persistent CSI transmissions on the first uplink carrier during CSI occasions that are orthogonal in time to uplink control information transmissions by the UE based at least in part on the piggybacking status for the first uplink carrier. In some examples, the CSI manager 1140 may receive a control message scheduling an aperiodic or semi-persistent CSI transmission on the first uplink carrier during a CSI occasion that overlaps in time with the uplink shared channel occasion. In some examples, the CSI manager 1140 may drop the aperiodic or semi-persistent CSI transmission on the first uplink carrier based at least in part on the piggybacking status for the first uplink carrier and the CSI occasion overlapping in time with the uplink shared channel occasion. In some examples, the CSI manager 1140 may perform a persistent CSI transmission on the second uplink carrier.

In some examples, the CSI manager 1140 may drop a persistent CSI transmission on the second uplink carrier based at least in part on the piggybacking status for the first uplink carrier and the CSI occasion overlapping in time with the uplink shared channel occasion. In some examples, the CSI manager 1140 may perform the aperiodic or semi-persistent CSI transmission on the first uplink carrier during the uplink control channel occasion. In some examples, the CSI manager 1140 may piggyback a persistent CSI transmission on the first uplink carrier based at least in part on the piggybacking status and the CSI occasion overlapping in time with the uplink shared channel occasion.

Figure 12:
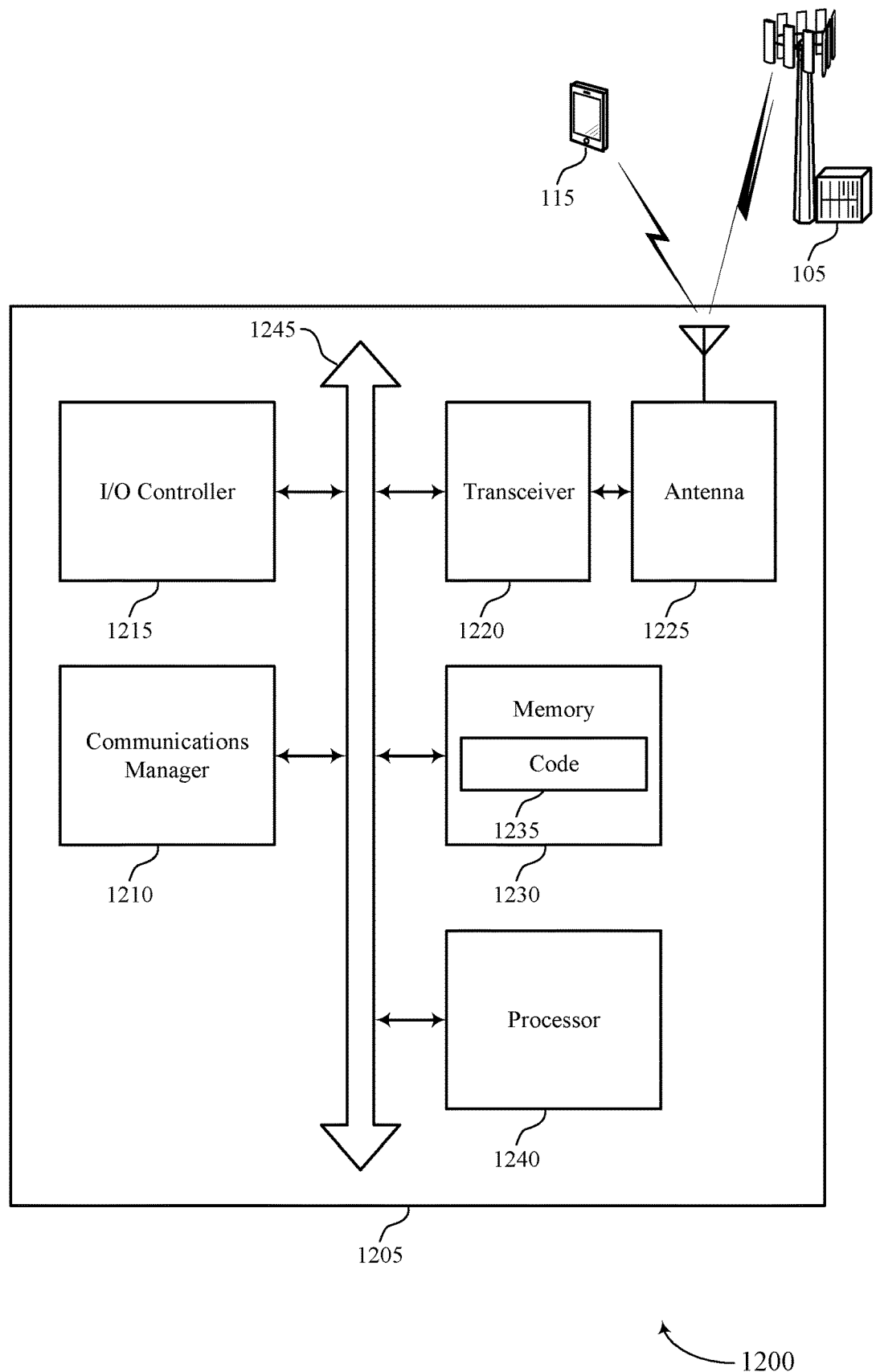
FIG. 12 shows a diagram of a system including a device that supports simultaneous feedback information and uplink shared channel transmissions in accordance with aspects of the present disclosure.

FIG. 12 shows a diagram of a system 1200 including a device 1205 that supports simultaneous feedback information and uplink shared channel transmissions in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive a piggybacking status for a first uplink carrier of a plurality of uplink carriers configured for the UE, receive a first uplink grant that indicates an uplink shared channel occasion on the first uplink carrier, generate uplink control information for a downlink transmission from a base station, wherein the uplink control information is associated with an uplink control channel occasion that overlaps in time with the uplink shared channel occasion, and perform, based at least in part on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include a hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting simultaneous uplink control information and uplink shared channel transmissions).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The device 1205 as described herein may be implemented to realize one or more potential advantages. One implementation may allow the device 1205 to more efficiently and reliably transmit UCI to one or more base stations, and more specifically to disable UCI piggybacking on uplink shared channels in some scenarios. For example, the device 1205 may receive a UCI piggybacking status from a base station and identify a configuration to use for transmitting feedback to a base station, based at least in part on the received piggybacking status.

Based on implementing the piggybacking status techniques as described herein, the device may achieve better data throughput, reduced latency, reduced power consumption, improved battery life, and a better user experience.

Figure 13:
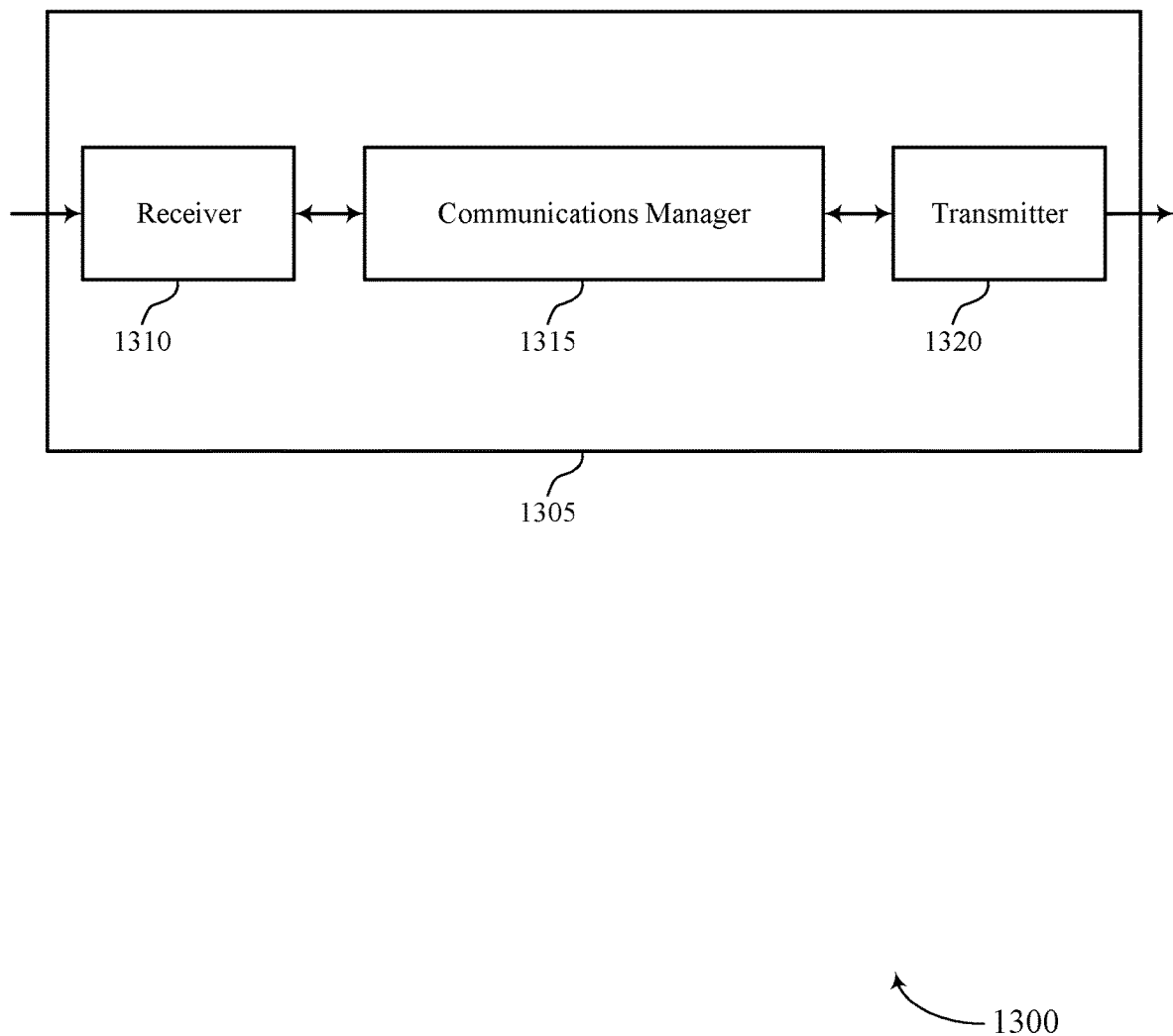
FIGS. 13 and 14 show block diagrams of devices that support simultaneous feedback information and uplink shared channel transmissions in accordance with aspects of the present disclosure.

FIG. 13 shows a block diagram 1300 of a device 1305 that supports simultaneous feedback information and uplink shared channel transmissions in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to simultaneous feedback information and uplink shared channel transmissions, etc.). Information may be passed on to other components of the device 1305. The receiver 1310 may be an example of aspects of the transceiver 1620 described with reference to FIG. 16. The receiver 1310 may utilize a single antenna or a plurality of antennas.

The communications manager 1315 may transmit to a UE a piggybacking status for a first uplink carrier of a plurality of uplink carriers configured for the UE, transmit a first uplink grant that indicates an uplink shared channel occasion on the first uplink carrier, wherein the uplink shared channel occasion overlaps in time with an uplink control channel occasion associated with uplink control information for a downlink transmission from the base station, and receive, based at least in part on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a plurality of antennas.

The device 1305 as described herein may be implemented to realize one or more potential advantages. One implementation may allow the device 1305 to more efficiently and reliably transmit UCI to one or more base stations, and more specifically to disable UCI piggybacking on uplink shared channels in some scenarios. For example, the device 1305 may receive a UCI piggybacking status from a base station and identify a configuration to use for transmitting feedback to a base station, based at least in part on the received piggybacking status.

Based on implementing the piggybacking status techniques as described herein, a processor of a UE 115 (e.g., receiver 1310, transmitter 1320) may increase reliability and increase signaling efficiency in the communication of feedback because UCI piggybacking may be dynamically disabled based on the network.

Figure 14:
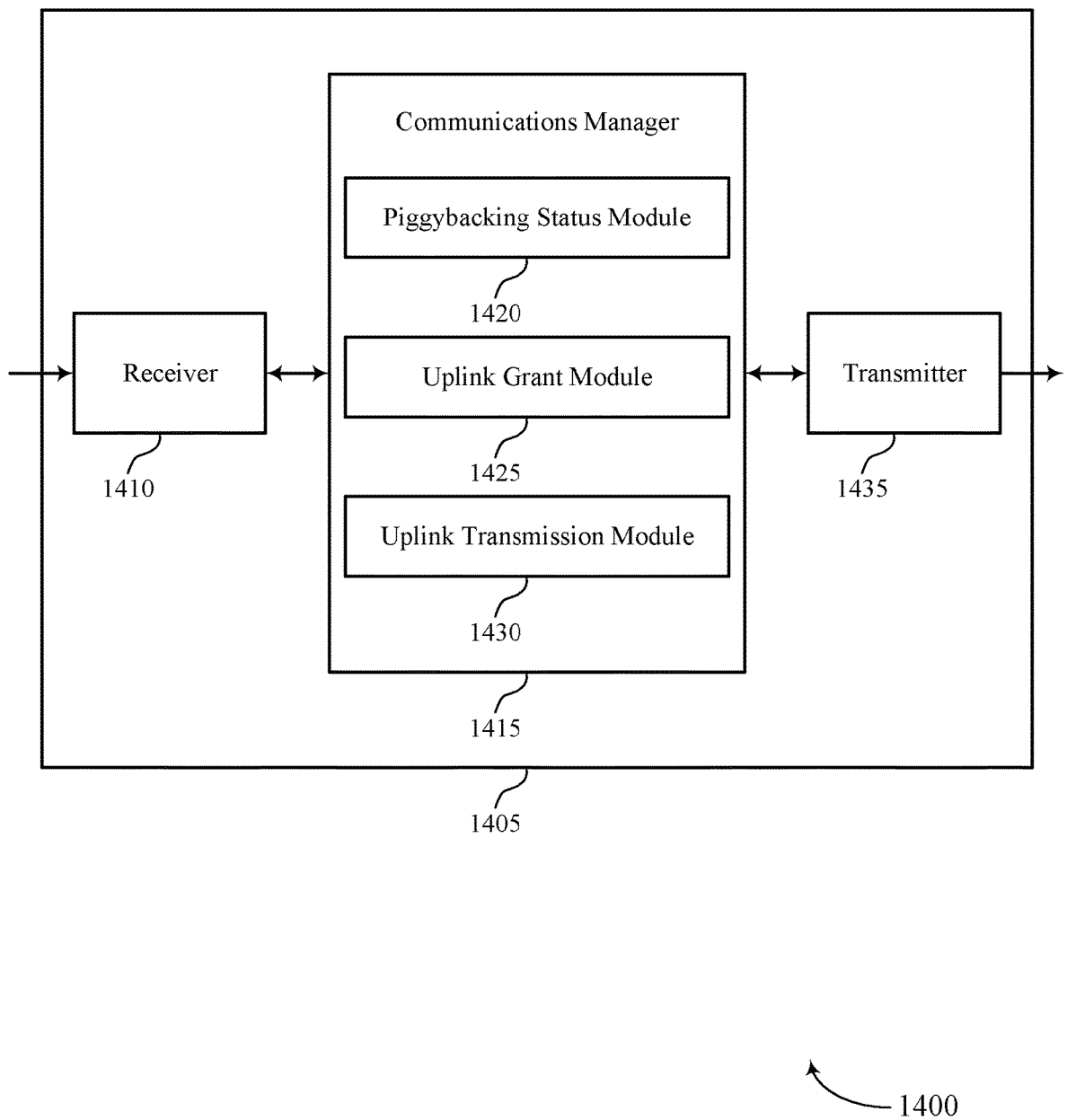

FIG. 14 shows a block diagram 1400 of a device 1405 that supports simultaneous feedback information and uplink shared channel transmissions in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to simultaneous feedback information and uplink shared channel transmissions, etc.). Information may be passed on to other components of the device 1405. The receiver 1410 may be an example of aspects of the transceiver 1620 described with reference to FIG. 16. The receiver 1410 may utilize a single antenna or a plurality of antennas.

The communications manager 1415 may be an example of aspects of the communications manager 1315 as described herein. The communications manager 1415 may include a piggybacking status module 1420, an uplink grant module 1425, and an uplink transmission module 1430. The communications manager 1415 may be an example of aspects of the communications manager 1610 described herein. The piggybacking status module 1420 may transmit to a UE a piggybacking status for a first uplink carrier of a plurality of uplink carriers configured for the UE.

The uplink grant module 1425 may transmit a first uplink grant that indicates an uplink shared channel occasion on the first uplink carrier, wherein the uplink shared channel occasion overlaps in time with an uplink control channel occasion associated with uplink control information for a downlink transmission from the base station.

The uplink transmission module 1430 may receive, based at least in part on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a plurality of antennas.

Figure 15:
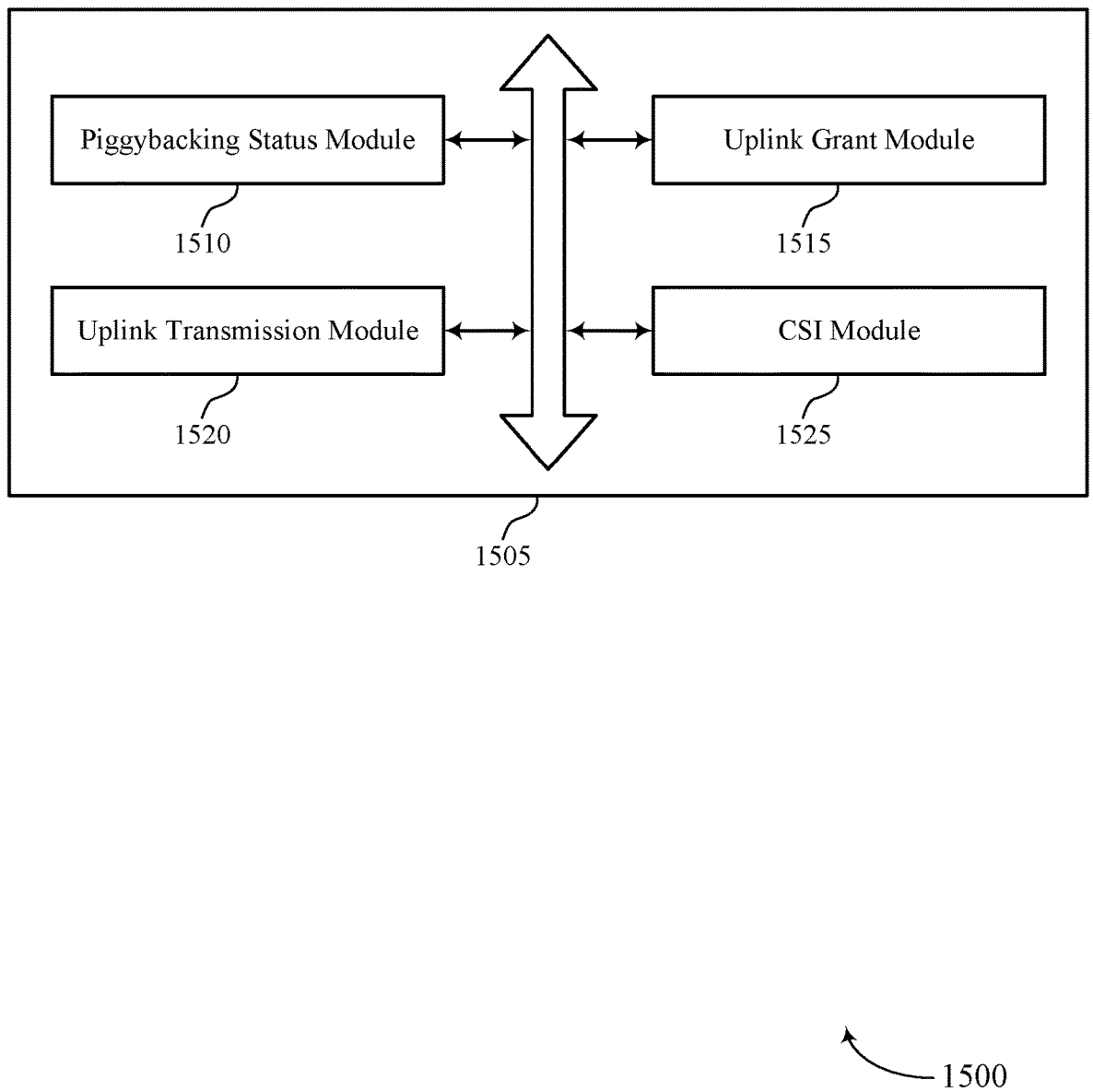
FIG. 15 shows a block diagram of a communications manager that supports simultaneous feedback information and uplink shared channel transmissions in accordance with aspects of the present disclosure.

FIG. 15 shows a block diagram 1500 of a communications manager 1505 that supports simultaneous feedback information and uplink shared channel transmissions in accordance with aspects of the present disclosure. The communications manager 1505 may be an example of aspects of a communications manager 1315, a communications manager 1415, or a communications manager 1610 described herein. The communications manager 1505 may include a piggybacking status module 1510, an uplink grant module 1515, an uplink transmission module 1520, and a CSI module 1525. Each of these modules may communicate, directly or indirectly, with one another (e.g., via one or more buses).

The piggybacking status module 1510 may transmit to a UE a piggybacking status for a first uplink carrier of a plurality of uplink carriers configured for the UE. In some examples, the piggybacking status module 1510 may transmit a control message including an indication that uplink control information piggybacking is disabled for the first uplink carrier. In some examples, transmitting a control message including an indication that uplink control information piggybacking is disabled for a group of uplink carriers within the plurality of uplink carriers, wherein the group of uplink carriers includes the first uplink carrier. In some examples, the piggybacking status module 1510 may frequency range, frequency band, TA group, cell group, PUCCH group, or UE. In some examples, the piggybacking status module 1510 may transmit a control message including an indication that uplink control information piggybacking is enabled for a group of uplink carriers within the plurality of uplink carriers, wherein the first uplink carrier is absent from the group of uplink carriers.

The uplink grant module 1515 may transmit a first uplink grant that indicates an uplink shared channel occasion on the first uplink carrier, wherein the uplink shared channel occasion overlaps in time with an uplink control channel occasion associated with uplink control information for a downlink transmission from the base station. In some examples, the uplink grant module 1515 may transmit a downlink assignment index in the first uplink grant, wherein the uplink shared channel transmission is encoded irrespective of the downlink assignment index. In some examples, the uplink grant module 1515 may transmit a second uplink grant that indicates a second uplink shared channel transmission occasion on the second uplink carrier, the second uplink grant including a downlink assignment index, wherein a codebook size for the uplink control transmission on the second uplink carrier is based at least in part on the downlink assignment index of the second uplink grant.

In some cases, the downlink assignment index in the first uplink grant is fixed at a value of 0 based at least in part on the piggybacking status for the first uplink carrier. In some cases, a codebook size for the uplink control transmission on the second uplink carrier is based at least in part on the downlink assignment index in the first uplink grant. In some cases, a downlink assignment index is absent from the first uplink grant. In some cases, an uplink shared channel indication field in the first uplink grant is set to a bit value of 1 based at least in part on the CSI occasion overlapping with the uplink shared channel occasion.

The uplink transmission module 1520 may receive, based at least in part on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion. In some examples, the uplink transmission module 1520 may receive a persistent CSI transmission on the second uplink carrier, wherein the aperiodic or semi-persistent CSI transmission is dropped on the first uplink carrier based at least in part on the piggybacking status for the first uplink carrier and the CSI occasion overlapping in time with the uplink shared channel occasion.

In some cases, a minimum uplink shared transmission preparation time of the first uplink carrier remains fixed and irrespective of other carriers based at least in part on the piggybacking status. In some cases, a minimum uplink shared transmission preparation time of the first uplink carrier is based at least in part on the piggybacking status, an uplink shared transmission preparation time associated with the second uplink carrier, and a minimum SCS configuration used for scheduling an uplink control channel transmission overlapping in time with the uplink shared channel occasion.

The CSI module 1525 may disable aperiodic or semi-persistent CSI transmissions on the first uplink carrier disabled based at least in part on the piggybacking status for the first uplink carrier. In some examples, the CSI module 1525 may receive aperiodic or semi-persistent CSI transmissions on the first uplink carrier during CSI occasions that are orthogonal in time to uplink control information transmissions by the UE based at least in part on the piggybacking status for the first uplink carrier. In some examples, the CSI module 1525 may transmit a control message scheduling an aperiodic or semi-persistent CSI transmission on the first uplink carrier during a CSI occasion that overlaps in time with the uplink shared channel occasion.

In some examples, the CSI module 1525 may receive the aperiodic or semi-persistent CSI transmission on the first uplink carrier, wherein a persistent CSI transmission is dropped on the second uplink carrier based at least in part on the piggybacking status for the first uplink carrier and the CSI occasion overlapping in time with the uplink shared channel occasion. In some cases, a persistent CSI transmission is piggybacked on the first uplink carrier based at least in part on the piggybacking status and the CSI occasion overlapping in time with the uplink shared channel occasion.

Figure 16:
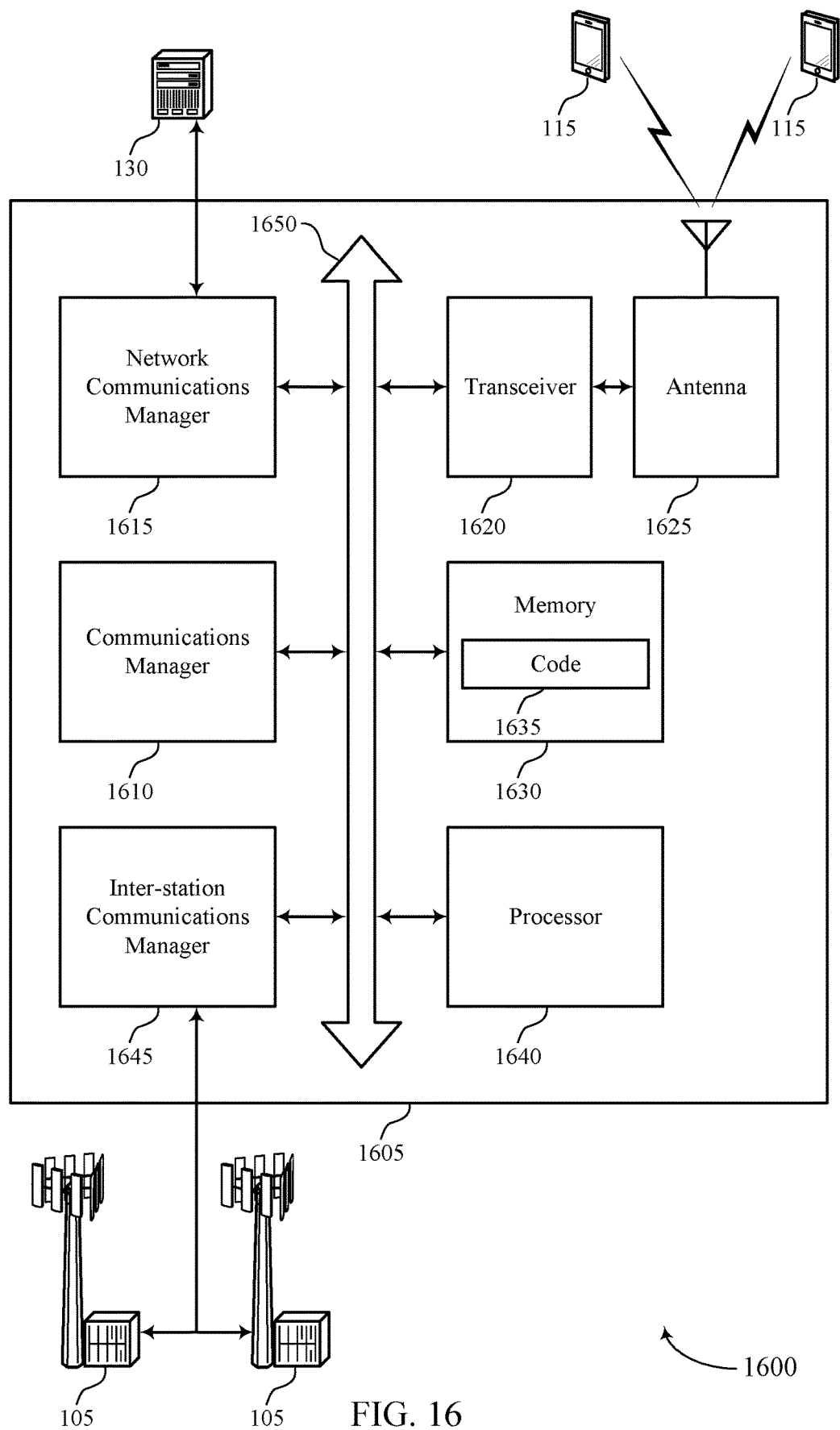
FIG. 16 shows a diagram of a system including a device that supports simultaneous feedback information and uplink shared channel transmissions in accordance with aspects of the present disclosure.

FIG. 16 shows a diagram of a system 1600 including a device 1605 that supports simultaneous feedback information and uplink shared channel transmissions in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit to a UE a piggybacking status for a first uplink carrier of a plurality of uplink carriers configured for the UE, transmit a first uplink grant that indicates an uplink shared channel occasion on the first uplink carrier, wherein the uplink shared channel occasion overlaps in time with an uplink control channel occasion associated with uplink control information for a downlink transmission from the base station, and receive, based at least in part on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include a hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting simultaneous feedback information and uplink shared channel transmissions).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

The device 1605 as described herein may be implemented to realize one or more potential advantages. One implementation may allow the device 1605 to more efficiently and reliably transmit UCI to one or more base stations, and more specifically to disable UCI piggybacking on uplink shared channels in some scenarios. For example, the device 1605 may receive a UCI piggybacking status from a base station and identify a configuration to use for transmitting feedback to a base station, based at least in part on the received piggybacking status.

Based on implementing the piggybacking status techniques as described herein, a processor of a UE 115 (e.g., transceiver 1620) may increase reliability and increase signaling efficiency in the communication of feedback because UCI piggybacking may be dynamically disabled based on the network.

Figure 17:
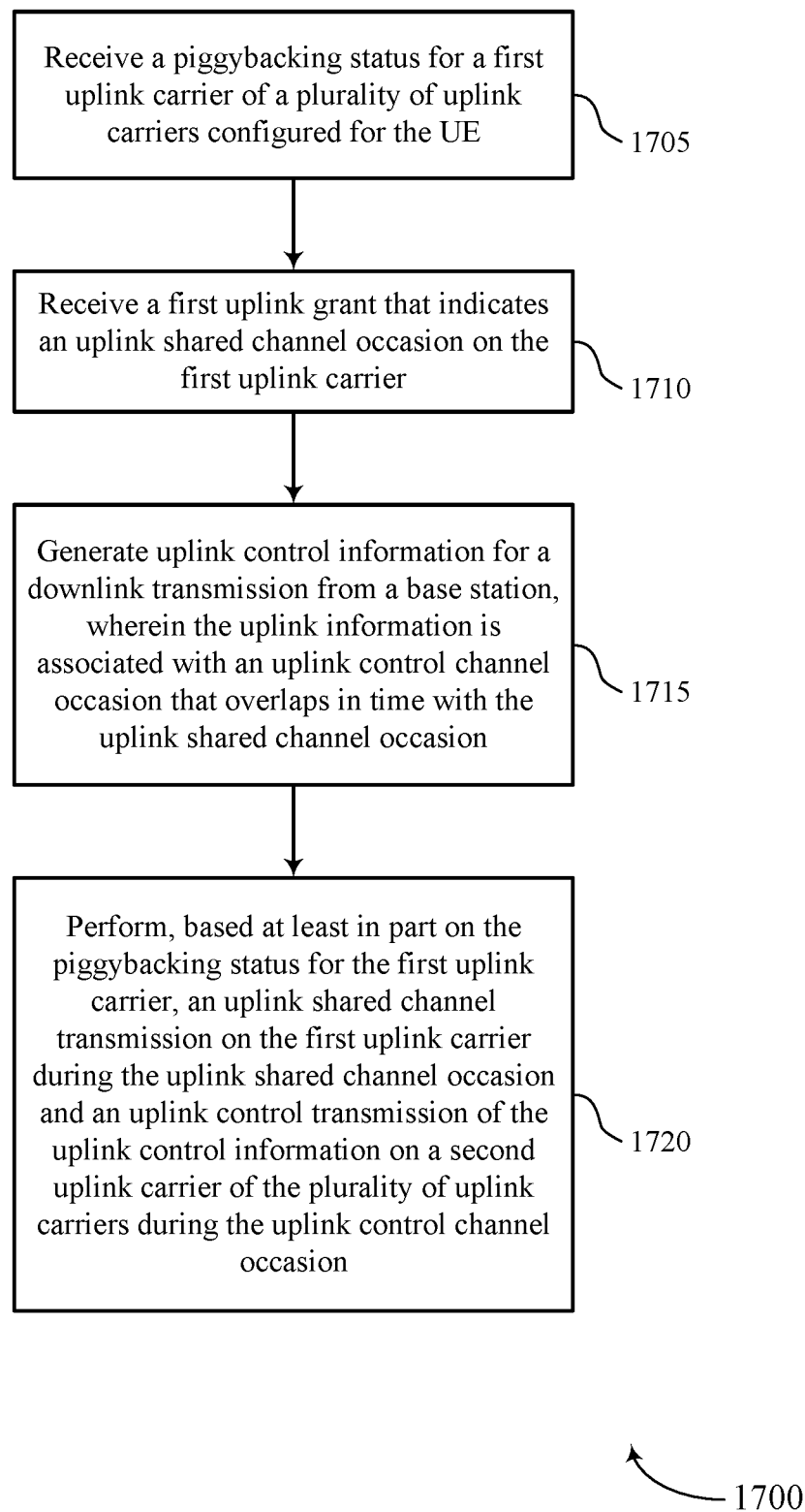
FIGS. 17 through 20 show flowcharts illustrating methods that support simultaneous feedback information and uplink shared channel transmissions in accordance with aspects of the present disclosure.

FIG. 17 shows a flowchart illustrating a method 1700 that supports simultaneous feedback information and uplink shared channel transmissions in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive a piggybacking status for a first uplink carrier of a plurality of uplink carriers configured for the UE. The operations of 1705 may be performed according to the methods described herein. In some examples, aspects of the operations of 1705 may be performed by a piggybacking status manager as described with reference to FIGS. 9 through 12.

At 1710, the UE may receive a first uplink grant that indicates an uplink shared channel occasion on the first uplink carrier. The operations of 1710 may be performed according to the methods described herein. In some examples, aspects of the operations of 1710 may be performed by an uplink grant manager as described with reference to FIGS. 9 through 12.

At 1715, the UE may generate uplink control information for a downlink transmission from a base station, wherein the uplink control information is associated with an uplink control channel occasion that overlaps in time with the uplink shared channel occasion. The operations of 1715 may be performed according to the methods described herein. In some examples, aspects of the operations of 1715 may be performed by a uplink control information manager as described with reference to FIGS. 9 through 12.

At 1720, the UE may perform, based at least in part on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion. The operations of 1720 may be performed according to the methods described herein. In some examples, aspects of the operations of 1720 may be performed by an uplink transmission manager as described with reference to FIGS. 9 through 12.

Figure 18:
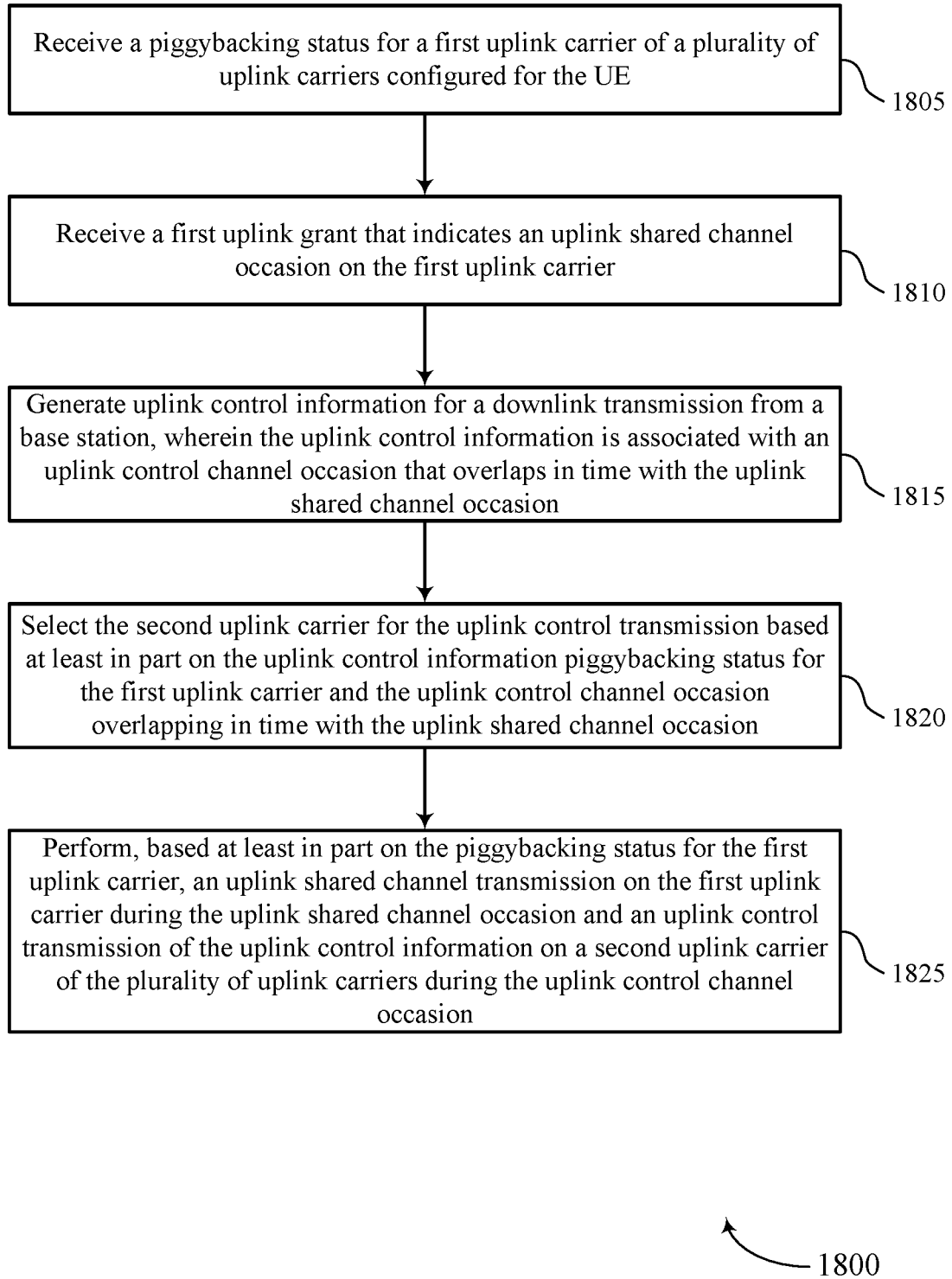

FIG. 18 shows a flowchart illustrating a method 1800 that supports simultaneous feedback information and uplink shared channel transmissions in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a plurality of instructions to control the functional elements of the UE to perform the functions described below. Additionally or alternatively, a UE may perform aspects of the functions described below using special-purpose hardware.

At 1805, the UE may receive a piggybacking status for a first uplink carrier of a plurality of uplink carriers configured for the UE. The operations of 1805 may be performed according to the methods described herein. In some examples, aspects of the operations of 1805 may be performed by a piggybacking status manager as described with reference to FIGS. 9 through 12.

At 1810, the UE may receive a first uplink grant that indicates an uplink shared channel occasion on the first uplink carrier. The operations of 1810 may be performed according to the methods described herein. In some examples, aspects of the operations of 1810 may be performed by an uplink grant manager as described with reference to FIGS. 9 through 12.

At 1815, the UE may generate uplink control information for a downlink transmission from a base station, wherein the uplink control information is associated with an uplink control channel occasion that overlaps in time with the uplink shared channel occasion. The operations of 1815 may be performed according to the methods described herein. In some examples, aspects of the operations of 1815 may be performed by a feedback information manager as described with reference to FIGS. 9 through 12.

At 1820, the UE may select the second uplink carrier for the uplink control transmission based at least in part on the piggybacking status for the first uplink carrier and the uplink control channel occasion overlapping in time with the uplink shared channel occasion. The operations of 1820 may be performed according to the methods described herein. In some examples, aspects of the operations of 1820 may be performed by a feedback transmission manager as described with reference to FIGS. 9 through 12.

At 1825, the UE may perform, based at least in part on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion. The operations of 1825 may be performed according to the methods described herein. In some examples, aspects of the operations of 1825 may be performed by an uplink transmission manager as described with reference to FIGS. 9 through 12.

Figure 19:
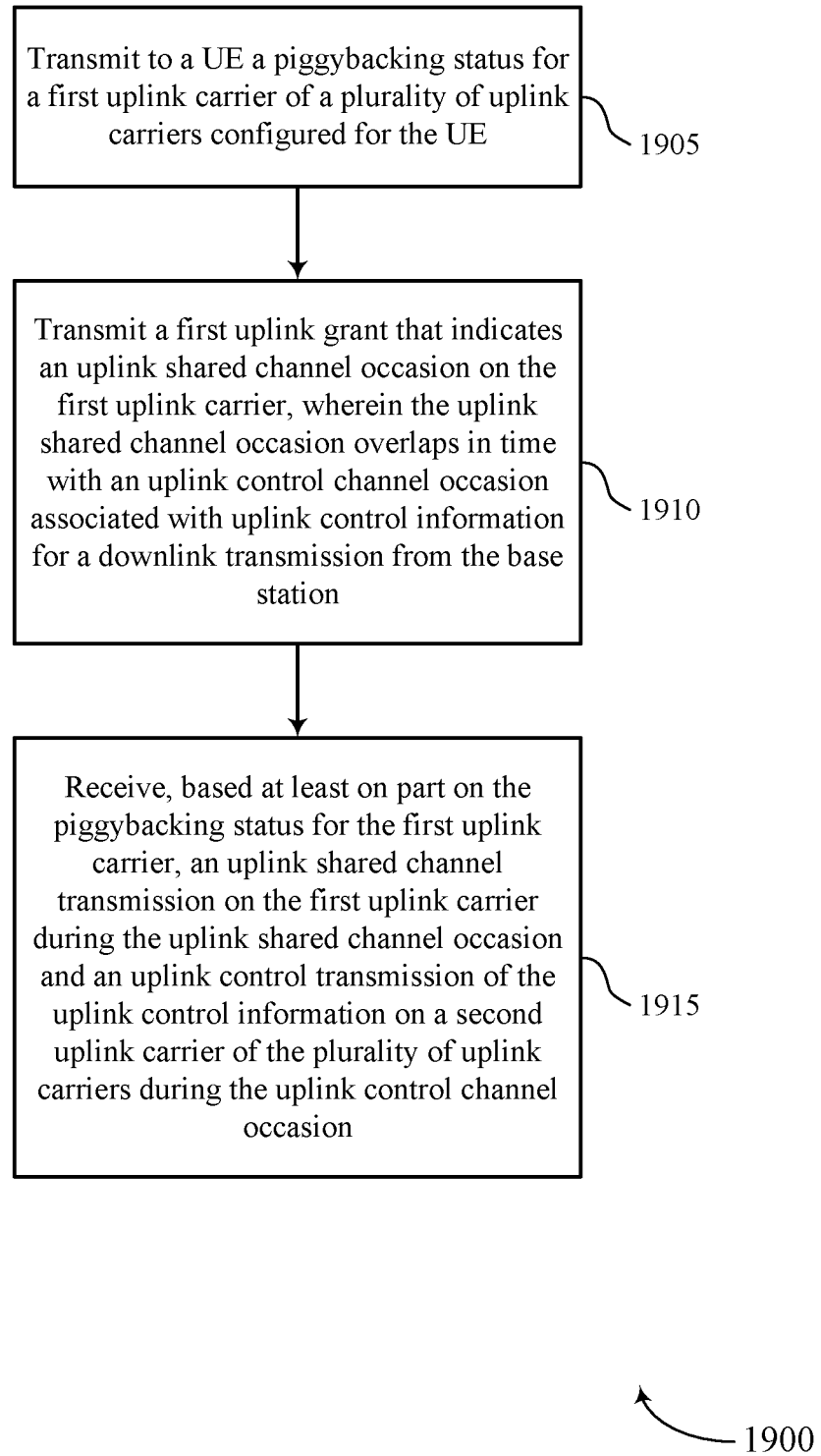

FIG. 19 shows a flowchart illustrating a method 1900 that supports simultaneous feedback information and uplink shared channel transmissions in accordance with aspects of the present disclosure. The operations of method 1900 may be implemented by a base station 105 or its components as described herein. For example, the operations of method 1900 may be performed by a communications manager as described with reference to FIGS. 13 through 16. In some examples, a base station may execute a plurality of instructions to control the functional elements of the base station to perform the functions described below. Additionally or alternatively, a base station may perform aspects of the functions described below using special-purpose hardware.

At 1905, the base station may transmit to a UE a piggybacking status for a first uplink carrier of a plurality of uplink carriers configured for the UE. The operations of 1905 may be performed according to the methods described herein. In some examples, aspects of the operations of 1905 may be performed by a piggybacking status module as described with reference to FIGS. 13 through 16.

At 1910, the base station may transmit a first uplink grant that indicates an uplink shared channel occasion on the first uplink carrier, wherein the uplink shared channel occasion overlaps in time with an uplink control channel occasion associated with uplink control information for a downlink transmission from the base station. The operations of 1910 may be performed according to the methods described herein. In some examples, aspects of the operations of 1910 may be performed by an uplink grant module as described with reference to FIGS. 13 through 16.

At 1915, the base station may receive, based at least in part on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion. The operations of 1915 may be performed according to the methods described herein. In some examples, aspects of the operations of 1915 may be performed by an uplink transmission module as described with reference to FIGS. 13 through 16.

Figure 20:
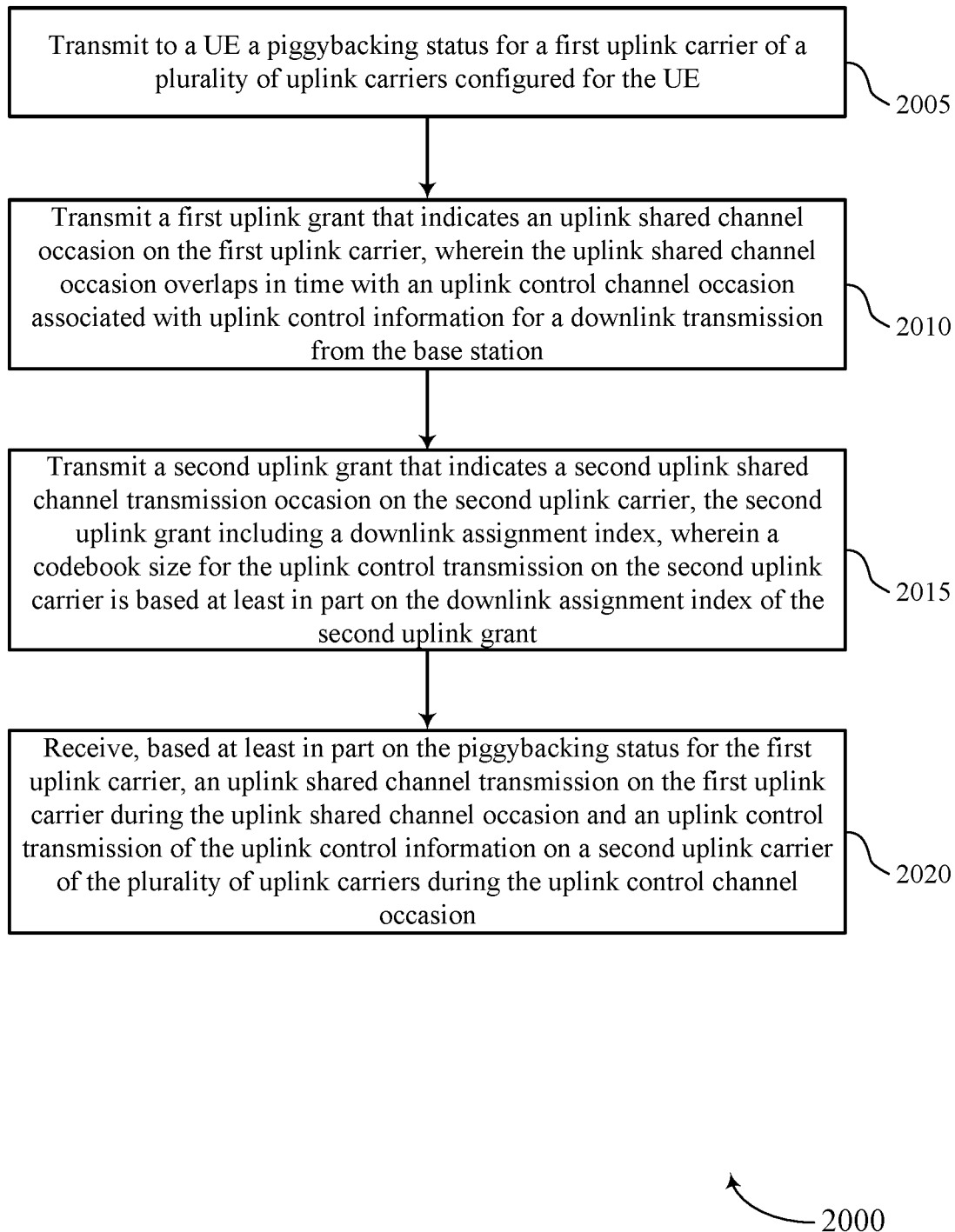

FIG. 20 shows a flowchart illustrating a method 2000 that supports simultaneous feedback information and uplink shared channel transmissions in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a plurality of instructions to control the functional elements of the base station to perform the functions described below. Additionally or alternatively, a base station may perform aspects of the functions described below using special-purpose hardware.

At 2005, the base station may transmit to a UE a piggybacking status for a first uplink carrier of a plurality of uplink carriers configured for the UE. The operations of 2005 may be performed according to the methods described herein. In some examples, aspects of the operations of 2005 may be performed by a piggybacking status module as described with reference to FIGS. 13 through 16.

At 2010, the base station may transmit a first uplink grant that indicates an uplink shared channel occasion on the first uplink carrier, wherein the uplink shared channel occasion overlaps in time with an uplink control channel occasion associated with uplink control information for a downlink transmission from the base station. The operations of 2010 may be performed according to the methods described herein. In some examples, aspects of the operations of 2010 may be performed by an uplink grant module as described with reference to FIGS. 13 through 16.

At 2015, the base station may transmit a second uplink grant that indicates a second uplink shared channel transmission occasion on the second uplink carrier, the second uplink grant including a downlink assignment index, wherein a codebook size for the uplink control transmission on the second uplink carrier is based at least in part on the downlink assignment index of the second uplink grant. The operations of 2015 may be performed according to the methods described herein. In some examples, aspects of the operations of 2015 may be performed by an uplink grant module as described with reference to FIGS. 13 through 16.

At 2020, the base station may receive, based at least in part on the piggybacking status for the first uplink carrier, an uplink shared channel transmission on the first uplink carrier during the uplink shared channel occasion and a uplink control transmission of the uplink control information on a second uplink carrier of the plurality of uplink carriers during the uplink control channel occasion. The operations of 2020 may be performed according to the methods described herein. In some examples, aspects of the operations of 2020 may be performed by an uplink transmission module as described with reference to FIGS. 13 through 16.

The following provides an overview of aspects of the present disclosure:

Aspect 1: A method for wireless communication at a UE, comprising: receiving a piggybacking status for a first uplink carrier of a plurality of uplink carriers configured for the UE; receiving a first uplink grant that indicates an uplink shared channel occasion on the first uplink carrier; generating uplink control information for a downlink transmission from a base station, wherein the uplink control information is associated with an uplink control channel occasion that overlaps in time with the uplink shared channel occasion; and performing, based at least in part on the piggybacking status for the first uplink carrier, an uplink shared channel transmission on the first uplink carrier during the uplink shared channel occasion and an uplink control transmission of the uplink control information on a second uplink carrier of the plurality of uplink carriers during the uplink control channel occasion.

Aspect 2: The method of aspect 1, further comprising: selecting the second uplink carrier for the uplink control transmission based at least in part on the piggybacking status for the first uplink carrier and the uplink control channel occasion overlapping in time with the uplink shared channel occasion.

Aspect 3: The method of any of aspects 1 through 2, wherein receiving the piggybacking status for the first uplink carrier comprises: receiving a control message comprising an indication that uplink control information piggybacking is disabled for the first uplink carrier.

Aspect 4: The method of any of aspects 1 through 3, wherein receiving the piggybacking status for the first uplink carrier comprises: receiving a control message comprising an indication that uplink control information piggybacking is disabled for a group of uplink carriers within the plurality of uplink carriers, wherein the group of uplink carriers comprises the first uplink carrier.

Aspect 5: The method of any of aspects 1 through 4, wherein receiving the piggybacking status for the first uplink carrier comprises: receiving a control message comprising an indication that uplink control information piggybacking is enabled for a group of uplink carriers within the plurality of uplink carriers, wherein the first uplink carrier is absent from the group of uplink carriers.

Aspect 6: The method of aspect 5, wherein the control message is configured per cell-group, or per uplink control channel group, or a combination thereof.

Aspect 7: The method of any of aspects 1 through 6, wherein receiving the first uplink grant comprises: receiving a downlink assignment index in the first uplink grant; and wherein performing the uplink shared channel transmission comprises encoding the uplink shared channel transmission irrespective of the downlink assignment index.

Aspect 8: The method of aspect 7, further comprising: ignoring the downlink assignment index in the first uplink grant based at least in part on the piggybacking status for the first uplink carrier.

Aspect 9: The method of any of aspects 7 through 8, wherein the downlink assignment index in the first uplink grant is fixed at a preconfigured value based at least in part on the piggybacking status for the first uplink carrier.

Aspect 10: The method of any of aspects 7 through 9, further comprising: determining a codebook size for the uplink control transmission on the second uplink carrier based at least in part on the downlink assignment index in the first uplink grant.

Aspect 11: The method of any of aspects 1 through 10, further comprising: receiving a second uplink grant that indicates a second uplink shared channel transmission occasion on the second uplink carrier, the second uplink grant comprising a downlink assignment index; and determining a codebook size for the uplink control transmission on the second uplink carrier based at least in part on the downlink assignment index of the second uplink grant.

Aspect 12: The method of any of aspects 1 through 11, wherein a downlink assignment index is absent from the first uplink grant.

Aspect 13: The method of any of aspects 1 through 12, wherein aperiodic or semi-persistent channel state information transmissions on the first uplink carrier are disabled based at least in part on the piggybacking status for the first uplink carrier.

Aspect 14: The method of any of aspects 1 through 13, wherein an uplink shared channel indication field in the first uplink grant is set to a bit value of 1 based at least in part on a channel state information occasion overlapping with the uplink shared channel occasion.

Aspect 15: The method of any of aspects 1 through 14, further comprising: transmitting aperiodic or semi-persistent channel state information transmissions on the first uplink carrier during channel state information occasions that are orthogonal in time to uplink control information transmissions by the UE based at least in part on the piggybacking status for the first uplink carrier.

Aspect 16: The method of any of aspects 1 through 15, further comprising: receiving a control message scheduling an aperiodic or semi-persistent channel state information transmission on the first uplink carrier during a channel state information occasion that overlaps in time with the uplink shared channel occasion.

Aspect 17: The method of aspect 16, further comprising: dropping the aperiodic or semi-persistent channel state information transmission on the first uplink carrier based at least in part on the piggybacking status for the first uplink carrier and the channel state information occasion overlapping in time with the uplink shared channel occasion; and performing a persistent channel state information transmission on the second uplink carrier.

Aspect 18: The method of any of aspects 16 through 17, further comprising: dropping a persistent channel state information transmission on the second uplink carrier based at least in part on the piggybacking status for the first uplink carrier and the channel state information occasion overlapping in time with the uplink shared channel occasion; and performing the aperiodic or semi-persistent channel state information transmission on the first uplink carrier during the uplink control channel occasion.

Aspect 19: The method of any of aspects 16 through 18, further comprising: piggybacking a persistent channel state information transmission on the first uplink carrier based at least in part on the piggybacking status and the channel state information occasion overlapping in time with the uplink shared channel occasion.

Aspect 20: The method of any of aspects 1 through 19, wherein a minimum uplink shared transmission preparation time of the first uplink carrier remains fixed and irrespective of other carriers based at least in part on the piggybacking status.

Aspect 21: The method of any of aspects 1 through 20, wherein a minimum uplink shared transmission preparation time of the first uplink carrier is based at least in part on the piggybacking status, an uplink shared transmission preparation time associated with the second uplink carrier, and a minimum subcarrier spacing configuration used for scheduling an uplink control channel transmission overlapping in time with the uplink shared channel occasion.

Aspect 22: The method of claim 0 wherein the group of uplink carriers grouped according to one or more of: frequency range, frequency band, timing advance group, cell group, physical uplink control channel group, or UE.

Aspect 23: A method for wireless communication at a base station, comprising: transmitting to a UE a piggybacking status for a first uplink carrier of a plurality of uplink carriers configured for the UE; transmitting a first uplink grant that indicates an uplink shared channel occasion on the first uplink carrier, wherein the uplink shared channel occasion overlaps in time with an uplink control channel occasion associated with uplink control information for a downlink transmission from the base station; and receiving, based at least in part on the piggybacking status for the first uplink carrier, an uplink shared channel transmission on the first uplink carrier during the uplink shared channel occasion and an uplink control transmission of the uplink control information on a second uplink carrier of the plurality of uplink carriers during the uplink control channel occasion.

Aspect 24: The method of aspect 23, wherein transmitting the piggybacking status for the first uplink carrier comprises: transmitting a control message comprising an indication that uplink control information piggybacking is disabled for the first uplink carrier.

Aspect 25: The method of any of aspects 23 through 24, wherein transmitting the piggybacking status for the first uplink carrier comprises: transmitting a control message comprising an indication that uplink control information piggybacking is disabled for a group of uplink carriers within the plurality of uplink carriers, wherein the group of uplink carriers comprises the first uplink carrier.

Aspect 26: The method of aspect 25, wherein the group of uplink carriers is grouped according to one or more of frequency range, frequency band, timing advance group, cell group, physical uplink control channel group, or UE.

Aspect 27: The method of any of aspects 23 through 26, wherein transmitting the piggybacking status for the first uplink carrier comprises: transmitting a control message comprising an indication that uplink control information piggybacking is enabled for a group of uplink carriers within the plurality of uplink carriers, wherein the first uplink carrier is absent from the group of uplink carriers.

Aspect 28: The method of any of aspects 23 through 27, wherein transmitting the first uplink grant comprises: transmitting a downlink assignment index in the first uplink grant, wherein the uplink shared channel transmission is encoded irrespective of the downlink assignment index.

Aspect 29: The method of aspect 28, wherein the downlink assignment index in the first uplink grant is fixed at a value of 0 based at least in part on the piggybacking status for the first uplink carrier.

Aspect 30: The method of any of aspects 28 through 29, wherein a codebook size for the uplink control transmission on the second uplink carrier is based at least in part on the downlink assignment index in the first uplink grant.

Aspect 31: The method of any of aspects 23 through 30, further comprising: transmitting a second uplink grant that indicates a second uplink shared channel transmission occasion on the second uplink carrier, the second uplink grant comprising a downlink assignment index, wherein a codebook size for the uplink control transmission on the second uplink carrier is based at least in part on the downlink assignment index of the second uplink grant.

Aspect 32: The method of any of aspects 23 through 31, wherein a downlink assignment index is absent from the first uplink grant.

Aspect 33: The method of any of aspects 23 through 32, further comprising: disabling aperiodic or semi-persistent channel state information transmissions on the first uplink carrier disabled based at least in part on the piggybacking status for the first uplink carrier.

Aspect 34: The method of any of aspects 23 through 33, wherein an uplink shared channel indication field in the first uplink grant is set to a bit value of 1 based at least in part on a channel state information occasion overlapping with the uplink shared channel occasion.

Aspect 35: The method of any of aspects 23 through 34, further comprising: receiving aperiodic or semi-persistent channel state information transmissions on the first uplink carrier during channel state information occasions that are orthogonal in time to uplink control information transmissions by the UE based on the piggybacking status for the first uplink carrier.

Aspect 36: The method of any of aspects 23 through 35, further comprising: transmitting a control message scheduling an aperiodic or semi-persistent channel state information transmission on the first uplink carrier during a channel state information occasion that overlaps in time with the uplink shared channel occasion.

Aspect 37: The method of aspect 36, further comprising: receiving a persistent channel state information transmission on the second uplink carrier, wherein the aperiodic or semi-persistent channel state information transmission is dropped on the first uplink carrier based at least in part on the piggybacking status for the first uplink carrier and the channel state information occasion overlapping in time with the uplink shared channel occasion.

Aspect 38: The method of any of aspects 36 through 37, further comprising: receiving the aperiodic or semi-persistent channel state information transmission on the first uplink carrier, wherein a persistent channel state information transmission is dropped on the second uplink carrier based at least in part on the piggybacking status for the first uplink carrier and the channel state information occasion overlapping in time with the uplink shared channel occasion.

Aspect 39: The method of any of aspects 36 through 38, wherein a persistent channel state information transmission is piggybacked on the first uplink carrier based at least in part on the piggybacking status and the channel state information occasion overlapping in time with the uplink shared channel occasion.

Aspect 40: The method of any of aspects 23 through 39, wherein a minimum uplink shared transmission preparation time of the first uplink carrier remains fixed and irrespective of other carriers based at least in part on the piggybacking status.

Aspect 41: The method of any of aspects 23 through 40, wherein a minimum uplink shared transmission preparation time of the first uplink carrier is based at least in part on the piggybacking status, an uplink shared transmission preparation time associated with the second uplink carrier, and a minimum subcarrier spacing configuration used for scheduling an uplink control channel transmission overlapping in time with the uplink shared channel occasion.

Aspect 42: An apparatus for wireless communication at a UE, comprising a processor; memory coupled with the processor; and instructions stored in the memory and executable by the processor to cause the apparatus to perform a method of any of aspects 1 through 21.

Aspect 43: An apparatus for wireless communication at a UE, comprising at least one means for performing a method of any of aspects 1 through 21.

Aspect 44: A non-transitory computer-readable medium storing code for wireless communication at a UE, the code comprising instructions executable by a processor to perform a method of any of aspects 1 through 21.

Aspect 45: An apparatus comprising a processor; memory coupled with the processor; and instructions stored in the memory and executable by the processor to cause the apparatus to perform a method of any of aspects 22 through 22.

Aspect 46: An apparatus comprising at least one means for performing a method of any of aspects 22 through 22.

Aspect 47: A non-transitory computer-readable medium storing code the code comprising instructions executable by a processor to perform a method of any of aspects 22 through 22.

Aspect 48: An apparatus for wireless communication at a base station, comprising a processor; memory coupled with the processor; and instructions stored in the memory and executable by the processor to cause the apparatus to perform a method of any of aspects 23 through 41.

Aspect 49: An apparatus for wireless communication at a base station, comprising at least one means for performing a method of any of aspects 23 through 41.

Aspect 50: A non-transitory computer-readable medium storing code for wireless communication at a base station, the code comprising instructions executable by a processor to perform a method of any of aspects 23 through 41.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a multiplexing status for a group of cells associated with a first plurality of uplink carriers configured for the UE, the multiplexing status indicating that simultaneous uplink control transmissions and uplink data transmissions are enabled;
   receiving a first uplink grant that indicates an uplink shared channel occasion on a first uplink carrier of the first plurality of uplink carriers;
   generating uplink control information for a downlink transmission from a network device, wherein the uplink control information is associated with an uplink control channel occasion that overlaps in time with the uplink shared channel occasion;
   performing, based at least in part on the multiplexing status for the group of cells, an uplink shared channel transmission on the first uplink carrier during the uplink shared channel occasion and an uplink control transmission of the uplink control information on a second uplink carrier of a second plurality of uplink carriers during the uplink control channel occasion; and
   dropping a channel state information transmission based at least in part on the multiplexing status for the group of cells and a channel state information occasion overlapping in time with the uplink shared channel occasion.

2. The method of claim 1, further comprising:
   selecting the second uplink carrier of the second plurality of uplink carriers for the uplink control transmission based at least in part on the multiplexing status for the group of cells and the uplink control channel occasion overlapping in time with the uplink shared channel occasion.

3. The method of claim 1, wherein receiving the multiplexing status for the group of cells comprises:
   receiving a control message comprising an indication that uplink control information multiplexing is disabled for the first uplink carrier.

4. The method of claim 1, wherein receiving the multiplexing status for the group of cells comprises:
   receiving a control message comprising an indication that uplink control information multiplexing is disabled for a group of uplink carriers within the first plurality of uplink carriers, wherein the group of uplink carriers comprises the first uplink carrier.

5. The method of claim 4 wherein the group of uplink carriers grouped according to one or more of:
   frequency range, frequency band, timing advance group, cell group, physical uplink control channel group, or UE.

6. The method of claim 1, wherein receiving the multiplexing status for the group of cells comprises:
   receiving a control message comprising an indication that uplink control information multiplexing is enabled for a group of uplink carriers within the second plurality of uplink carriers, wherein the first uplink carrier is absent from the group of uplink carriers.

7. The method of claim 6, wherein the control message is configured per cell-group, or per uplink control channel group, or a combination thereof.

8. The method of claim 1, wherein receiving the first uplink grant comprises:
   receiving a downlink assignment index in the first uplink grant; and
   wherein performing the uplink shared channel transmission comprises encoding the uplink shared channel transmission irrespective of the downlink assignment index.

9. The method of claim 8, further comprising:
   ignoring the downlink assignment index in the first uplink grant based at least in part on the multiplexing status for the group of cells.

10. The method of claim 8, wherein the downlink assignment index in the first uplink grant is fixed at a preconfigured value based at least in part on the multiplexing status for the group of cells.

11. The method of claim 8, further comprising:
    determining a codebook size for the uplink control transmission on the second uplink carrier based at least in part on the downlink assignment index in the first uplink grant.

12. The method of claim 1, further comprising:
    receiving a second uplink grant that indicates a second uplink shared channel transmission occasion on the second uplink carrier, the second uplink grant comprising a downlink assignment index; and determining a codebook size for the uplink control transmission on the second uplink carrier based at least in part on the downlink assignment index of the second uplink grant.

13. The method of claim 1, wherein a downlink assignment index is absent from the first uplink grant.

14. The method of claim 1, wherein:
aperiodic or semi-persistent channel state information transmissions on the first uplink carrier are disabled based at least in part on the multiplexing status for the group of cells.

15. The method of claim 1, wherein an uplink shared channel indication field in the first uplink grant is set to a bit value of 1 based at least in part on a channel state information occasion overlapping with the uplink shared channel occasion.

16. The method of claim 1, further comprising:
transmitting aperiodic or semi-persistent channel state information transmissions on the first uplink carrier during channel state information occasions that are orthogonal in time to uplink control information transmissions by the UE based at least in part on the multiplexing status for the group of cells.

17. The method of claim 1, further comprising:
receiving a control message scheduling an aperiodic or semi-persistent channel state information transmission on the first uplink carrier during the channel state information occasion that overlaps in time with the uplink shared channel occasion.

18. The method of claim 17, wherein dropping the channel state information transmission further comprises:
dropping the aperiodic or semi-persistent channel state information transmission on the first uplink carrier based at least in part on the multiplexing status for the group of cells and the channel state information occasion overlapping in time with the uplink shared channel occasion, wherein the channel state information transmission comprises the aperiodic or semi-persistent channel state information transmission; and
performing a persistent channel state information transmission on the second uplink carrier.

19. The method of claim 17, wherein dropping the channel state information transmission further comprises:
dropping a persistent channel state information transmission on the second uplink carrier based at least in part on the multiplexing status for the group of cells and the channel state information occasion overlapping in time with the uplink shared channel occasion, wherein the channel state information transmission comprises the persistent channel state information transmission; and
performing the aperiodic or semi-persistent channel state information transmission on the first uplink carrier during the uplink control channel occasion.

20. The method of claim 17, further comprising:
multiplexing a persistent channel state information transmission on the first uplink carrier based at least in part on the multiplexing status and the channel state information occasion overlapping in time with the uplink shared channel occasion.

21. The method of claim 1, wherein a minimum uplink shared transmission preparation time of the first uplink carrier remains fixed and irrespective of other carriers based at least in part on the multiplexing status.

22. The method of claim 1, wherein a minimum uplink shared transmission preparation time of the first uplink carrier is based at least in part on the multiplexing status, an uplink shared transmission preparation time associated with the second uplink carrier, and a minimum subcarrier spacing configuration used for scheduling an uplink control channel transmission overlapping in time with the uplink shared channel occasion.

23. A method for wireless communication at a network device, comprising:
transmitting to a user equipment (UE) a multiplexing status for a group of cells associated with a first plurality of uplink carriers configured for the UE, the multiplexing status indicating that simultaneous uplink control transmissions and uplink data transmissions are enabled;
transmitting a first uplink grant that indicates an uplink shared channel occasion on a first uplink carrier of the first plurality of uplink carriers, wherein the uplink shared channel occasion overlaps in time with an uplink control channel occasion associated with uplink control information for a downlink transmission from the network device; and
receiving, based at least in part on the multiplexing status for the group of cells, an uplink shared channel transmission on the first uplink carrier during the uplink shared channel occasion and an uplink control transmission of the uplink control information on a second uplink carrier of a second plurality of uplink carriers during the uplink control channel occasion, wherein a channel state information transmission is dropped based at least in part on the multiplexing status for the group of cells and a channel state information occasion, overlapping in time with the uplink shared channel occasion.

24. The method of claim 23, wherein transmitting the multiplexing status for the group of cells comprises:
transmitting a control message comprising an indication that uplink control information multiplexing is disabled for the first uplink carrier.

25. The method of claim 23, wherein transmitting the multiplexing status for the group of cells comprises:
transmitting a control message comprising an indication that uplink control information multiplexing is disabled for a group of uplink carriers within the first plurality of uplink carriers, wherein the group of uplink carriers comprises the first uplink carrier.

26. The method of claim 25, wherein the group of uplink carriers is grouped according to one or more of:
frequency range, frequency band, timing advance group, cell group, physical uplink control channel group, or UE.

27. The method of claim 23, wherein transmitting the multiplexing status for the group of cells comprises:
transmitting a control message comprising an indication that uplink control information multiplexing is enabled for a group of uplink carriers within the second plurality of uplink carriers, wherein the first uplink carrier is absent from the group of uplink carriers.

28. The method of claim 23, wherein transmitting the first uplink grant comprises:
transmitting a downlink assignment index in the first uplink grant, wherein the uplink shared channel transmission is encoded irrespective of the downlink assignment index.

29. The method of claim 28, wherein the downlink assignment index in the first uplink grant is fixed at a value of 0 based at least in part on the multiplexing status for the group of cells.

30. The method of claim 28, wherein a codebook size for the uplink control transmission on the second uplink carrier is based at least in part on the downlink assignment index in the first uplink grant.

31. The method of claim 23, further comprising:
transmitting a second uplink grant that indicates a second uplink shared channel transmission occasion on the second uplink carrier, the second uplink grant comprising a downlink assignment index, wherein a codebook size for the uplink control transmission on the second uplink carrier is based at least in part on the downlink assignment index of the second uplink grant.

32. The method of claim 23, wherein a downlink assignment index is absent from the first uplink grant.

33. The method of claim 23, further comprising:
disabling aperiodic or semi-persistent channel state information transmissions on the first uplink carrier disabled based at least in part on the multiplexing status for the group of cells.

34. The method of claim 23, wherein an uplink shared channel indication field in the first uplink grant is set to a bit value of 1 based at least in part on a channel state information occasion overlapping with the uplink shared channel occasion.

35. The method of claim 23, further comprising:
receiving aperiodic or semi-persistent channel state information transmissions on the first uplink carrier during channel state information occasions that are orthogonal in time to uplink control information transmissions by the UE based on the multiplexing status for the group of cells.

36. The method of claim 23, further comprising:
transmitting a control message scheduling an aperiodic or semi-persistent channel state information transmission on the first uplink carrier during the channel state information occasion that overlaps in time with the uplink shared channel occasion.

37. The method of claim 36, further comprising:
receiving a persistent channel state information transmission on the second uplink carrier, wherein the aperiodic or semi-persistent channel state information transmission is dropped on the first uplink carrier based at least in part on the multiplexing status for the group of cells and the channel state information occasion overlapping in time with the uplink shared channel occasion, the channel state information transmission comprising the aperiodic or semi-persistent channel state information transmission.

38. The method of claim 36, further comprising:
receiving the aperiodic or semi-persistent channel state information transmission on the first uplink carrier, wherein a persistent channel state information transmission is dropped on the second uplink carrier based at least in part on the multiplexing status for the first uplink carrier and the channel state information occasion overlapping in time with the uplink shared channel occasion, the channel state information transmission comprising the persistent channel state information transmission.

39. The method of claim 36, wherein a persistent channel state information transmission is multiplexing on the first uplink carrier based at least in part on the multiplexing status and the channel state information occasion overlapping in time with the uplink shared channel occasion.

40. The method of claim 23, wherein a minimum uplink shared transmission preparation time of the first uplink carrier remains fixed and irrespective of other carriers based at least in part on the multiplexing status.

41. The method of claim 23, wherein a minimum uplink shared transmission preparation time of the first uplink carrier is based at least in part on the multiplexing status, an uplink shared transmission preparation time associated with the second uplink carrier, and a minimum subcarrier spacing configuration used for scheduling an uplink control channel transmission overlapping in time with the uplink shared channel occasion.

42. An apparatus for wireless communication at a user equipment (UE), comprising:
a processor,
memory coupled with the processor; and
instructions stored in the memory and executable by the processor to cause the apparatus to:
receive a multiplexing status for a group of cells associated with a first plurality of uplink carriers configured for the UE, the multiplexing status indicating that simultaneous uplink control transmissions and uplink data transmissions are enabled;
receive a first uplink grant that indicates an uplink shared channel occasion on a first uplink carrier of the first plurality of uplink carriers;
generate uplink control information for a downlink transmission from a network device, wherein the uplink control information is associated with an uplink control channel occasion that overlaps in time with the uplink shared channel occasion;
perform, based at least in part on the multiplexing status for the group of cells, an uplink shared channel transmission on the first uplink carrier during the uplink shared channel occasion and an uplink control transmission of the uplink control information on a second uplink carrier of a second plurality of uplink carriers during the uplink control channel occasion; and
drop a channel state information transmission based at least in part on the multiplexing status for the group of cells and a channel state information occasion overlapping in time with the uplink shared channel occasion.

43. The apparatus of claim 42, wherein the instructions are further executable by the processor to cause the apparatus to:
select the second uplink carrier of the second plurality of uplink carriers for the uplink control transmission based at least in part on the multiplexing status for the group of cells and the uplink control channel occasion overlapping in time with the uplink shared channel occasion.

44. The apparatus of claim 42, wherein the instructions to receive the multiplexing status for the group of cells are executable by the processor to cause the apparatus to:
receive a control message comprising an indication that uplink control information multiplexing is disabled for the first uplink carrier.

45. The apparatus of claim 42, wherein the instructions to receive the multiplexing status for the group of cells are executable by the processor to cause the apparatus to:
receive a control message comprising an indication that uplink control information multiplexing is disabled for a group of uplink carriers within the first plurality of uplink carriers, wherein the group of uplink carriers comprises the first uplink carrier.

46. The apparatus of claim 45, frequency band, timing advance group, cell group, physical uplink control channel group, or UE.

47. The apparatus of claim 42, wherein the instructions to receive the multiplexing status for the group of cells are executable by the processor to cause the apparatus to:
   receive a control message comprising an indication that uplink control information multiplexing is enabled for a group of uplink carriers within the second plurality of uplink carriers, wherein the first uplink carrier is absent from the group of uplink carriers.

48. The apparatus of claim 47, wherein the control message is configured per cell-group, or per uplink control channel group, or a combination thereof.

49. The apparatus of claim 42, wherein the instructions to receive the first uplink grant are executable by the processor to cause the apparatus to:
   receive a downlink assignment index in the first uplink grant; and
   wherein performing the uplink shared channel transmission comprises encoding the uplink shared channel transmission irrespective of the downlink assignment index.

50. The apparatus of claim 49, wherein the instructions are further executable by the processor to cause the apparatus to:
   ignore the downlink assignment index in the first uplink grant based at least in part on the multiplexing status for the group of cells.

51. The apparatus of claim 49, wherein the downlink assignment index in the first uplink grant is fixed at a preconfigured value based at least in part on the multiplexing status for the first uplink carrier.

52. The apparatus of claim 49, wherein the instructions are further executable by the processor to cause the apparatus to:
   determine a codebook size for the uplink control transmission on the second uplink carrier based at least in part on the downlink assignment index in the first uplink grant.

53. The apparatus of claim 42, wherein the instructions are further executable by the processor to cause the apparatus to:
   receive a second uplink grant that indicates a second uplink shared channel transmission occasion on the second uplink carrier, the second uplink grant comprising a downlink assignment index; and
   determine a codebook size for the uplink control transmission on the second uplink carrier based at least in part on the downlink assignment index of the second uplink grant.

54. The apparatus of claim 42, wherein a downlink assignment index is absent from the first uplink grant.

55. The apparatus of claim 42, wherein aperiodic or semi-persistent channel state information transmissions on the first uplink carrier are disabled based at least in part on the multiplexing status for the group of cells.

56. The apparatus of claim 42, wherein an uplink shared channel indication field in the first uplink grant is set to a bit value of 1 based at least in part on a channel state information occasion overlapping with the uplink shared channel occasion.

57. The apparatus of claim 42, wherein the instructions are further executable by the processor to cause the apparatus to:
   transmit aperiodic or semi-persistent channel state information transmissions on the first uplink carrier during channel state information occasions that are orthogonal in time to uplink control information transmissions by the UE based on the multiplexing status for the group of cells.

58. The apparatus of claim 42, wherein the instructions are further executable by the processor to cause the apparatus to:
   receive a control message scheduling an aperiodic or semi-persistent channel state information transmission on the first uplink carrier during the channel state information occasion that overlaps in time with the uplink shared channel occasion.

59. The apparatus of claim 58, wherein the instructions to drop the channel state information transmission are further executable by the processor to cause the apparatus to:
   drop the aperiodic or semi-persistent channel state information transmission on the first uplink carrier based at least in part on the multiplexing status for the group of cells and the channel state information occasion overlapping in time with the uplink shared channel occasion; and
   perform a persistent channel state information transmission on the second uplink carrier.

60. The apparatus of claim 58, wherein the instructions to drop the channel state information transmission are further executable by the processor to cause the apparatus to:
   drop a persistent channel state information transmission on the second uplink carrier based at least in part on the multiplexing status for the group of cells and the channel state information occasion overlapping in time with the uplink shared channel occasion; and
   perform the aperiodic or semi-persistent channel state information transmission on the first uplink carrier during the uplink control channel occasion.

61. The apparatus of claim 58, wherein the instructions are further executable by the processor to cause the apparatus to:
   multiplex a persistent channel state information transmission on the first uplink carrier based at least in part on the multiplexing status and the channel state information occasion overlapping in time with the uplink shared channel occasion.

62. The apparatus of claim 42, wherein a minimum uplink shared transmission preparation time of the first uplink carrier remains fixed and irrespective of other carriers based at least in part on the multiplexing status.

63. The apparatus of claim 42, wherein a minimum uplink shared transmission preparation time of the first uplink carrier is based at least in part on the multiplexing status, an uplink shared transmission preparation time associated with the second uplink carrier, and a minimum subcarrier spacing configuration used for scheduling an uplink control channel transmission overlapping in time with the uplink shared channel occasion.

64. An apparatus for wireless communication at a network device, comprising:
   a processor,
   memory coupled with the processor; and
   instructions stored in the memory and executable by the processor to cause the apparatus to:
      transmit to a user equipment (UE) a multiplexing status for a group of cells associated with a first plurality of uplink carriers configured for the UE, the multiplexing status indicating that simultaneous uplink control transmissions and uplink data transmissions are enabled;

transmit a first uplink grant that indicates an uplink shared channel occasion on a first uplink carrier of the first plurality of uplink carriers, wherein the uplink shared channel occasion overlaps in time with an uplink control channel occasion associated with uplink control information for a downlink transmission from the network device; and receive, based at least in part on the multiplexing status for the group of cells, an uplink shared channel transmission on the first uplink carrier during the uplink shared channel occasion and an uplink control transmission of the uplink control information on a second uplink carrier of a second plurality of uplink carriers during the uplink control channel occasion, wherein a channel state information transmission is dropped based at least in part on the multiplexing status for the group of cells and a channel state information occasion overlapping in time with the uplink shared channel occasion.

65. The apparatus of claim 64, wherein the instructions to transmit the multiplexing status for the group of cells are executable by the processor to cause the apparatus to:

transmit a control message comprising an indication that uplink control information multiplexing is disabled for the first uplink carrier.

66. The apparatus of claim 64, wherein the instructions to transmit the multiplexing status for the group of cells are executable by the processor to cause the apparatus to:

transmit a control message comprising an indication that uplink control information multiplexing is disabled for a group of uplink carriers within the first plurality of uplink carriers, wherein the group of uplink carriers comprises the first uplink carrier.

67. The apparatus of claim 66, wherein the group of uplink carriers is grouped according to one or more of frequency range, frequency band, timing advance group, cell group, physical uplink control channel group, or UE.

68. The apparatus of claim 64, wherein the instructions to transmit the multiplexing status for the group of cells are executable by the processor to cause the apparatus to:

transmit a control message comprising an indication that uplink control information multiplexing is enabled for a group of uplink carriers within the second plurality of uplink carriers, wherein the first uplink carrier is absent from the group of uplink carriers.

69. The apparatus of claim 64, wherein the instructions to transmit the first uplink grant are executable by the processor to cause the apparatus to:

transmit a downlink assignment index in the first uplink grant, wherein the uplink shared channel transmission is encoded irrespective of the downlink assignment index.

70. The apparatus of claim 69, wherein the downlink assignment index in the first uplink grant is fixed at a value of 0 based at least in part on the multiplexing status for the group of cells.

71. The apparatus of claim 69, wherein a codebook size for the uplink control transmission on the second uplink carrier is based at least in part on the downlink assignment index in the first uplink grant.

72. The apparatus of claim 64, wherein the instructions are further executable by the processor to cause the apparatus to:

transmit a second uplink grant that indicates a second uplink shared channel transmission occasion on the second uplink carrier, the second uplink grant comprising a downlink assignment index, wherein a codebook size for the uplink control transmission on the second uplink carrier is based at least in part on the downlink assignment index of the second uplink grant.

73. The apparatus of claim 64, wherein a downlink assignment index is absent from the first uplink grant.

74. The apparatus of claim 64, wherein the instructions are further executable by the processor to cause the apparatus to:

disable aperiodic or semi-persistent channel state information transmissions on the first uplink carrier disabled based at least in part on the multiplexing status for the group of cells.

75. The apparatus of claim 64, wherein an uplink shared channel indication field in the first uplink grant is set to a bit value of 1 based at least in part on a channel state information occasion overlapping with the uplink shared channel occasion.

76. The apparatus of claim 64, wherein the instructions are further executable by the processor to cause the apparatus to:

receive aperiodic or semi-persistent channel state information transmissions on the first uplink carrier during channel state information occasions that are orthogonal in time to uplink control information transmissions by the UE based on the multiplexing status for the group of cells.

77. The apparatus of claim 64, wherein the instructions are further executable by the processor to cause the apparatus to:

transmit a control message scheduling an aperiodic or semi-persistent channel state information transmission on the first uplink carrier during the channel state information occasion that overlaps in time with the uplink shared channel occasion.

78. The apparatus of claim 77, wherein the instructions are further executable by the processor to cause the apparatus to:

receive a persistent channel state information transmission on the second uplink carrier, wherein the aperiodic or semi-persistent channel state information transmission is dropped on the first uplink carrier based at least in part on the multiplexing status for the group of cells and the channel state information occasion overlapping in time with the uplink shared channel occasion, the channel state information transmission comprising the aperiodic or semi-persistent channel state information transmission.

79. The apparatus of claim 77, wherein the instructions are further executable by the processor to cause the apparatus to:

receive the aperiodic or semi-persistent channel state information transmission on the first uplink carrier, wherein a persistent channel state information transmission is dropped on the second uplink carrier based at least in part on the multiplexing status for the group of cells and the channel state information occasion overlapping in time with the uplink shared channel occasion, the channel state information transmission comprising the persistent channel state information transmission.

80. The apparatus of claim 77, wherein a persistent channel state information transmission is multiplexing on the first uplink carrier based at least in part on the multiplexing status and the channel state information occasion overlapping in time with the uplink shared channel occasion.

81. The apparatus of claim 64, wherein a minimum uplink shared transmission preparation time of the first uplink carrier remains fixed and irrespective of other carriers based at least in part on the multiplexing status.

82. The apparatus of claim 64, wherein a minimum uplink shared transmission preparation time of the first uplink carrier is based at least in part on the multiplexing status, an uplink shared transmission preparation time associated with the second uplink carrier, and a minimum subcarrier spacing configuration used for scheduling an uplink control channel transmission overlapping in time with the uplink shared channel occasion.

* * * * *